United States Patent
Tomlinson et al.

(10) Patent No.: US 10,728,038 B2
(45) Date of Patent: Jul. 28, 2020

(54) MULTIPLE SECRETS IN QUORUM BASED DATA PROCESSING

(71) Applicant: PQ Solutions Limited, London (GB)

(72) Inventors: Martin Tomlinson, Totnes (GB); Cen Jung Tjhai, London (GB)

(73) Assignee: PQ Solutions Limited, London (GB)

( * ) Notice: Subject to any disclaimer, the term of this patent is extended or adjusted under 35 U.S.C. 154(b) by 205 days.

(21) Appl. No.: 15/467,815

(22) Filed: Mar. 23, 2017

(65) Prior Publication Data

US 2018/0054316 A1    Feb. 22, 2018

(30) Foreign Application Priority Data

Aug. 20, 2016   (GB) .................... 1614246.5

(51) Int. Cl.
  *G06F 21/00*   (2013.01)
  *H04L 29/06*   (2006.01)
  (Continued)

(52) U.S. Cl.
  CPC ............ *H04L 9/3247* (2013.01); *G06F 11/14* (2013.01); *G06F 21/40* (2013.01); *H04L 9/0631* (2013.01); *H04L 9/0643* (2013.01); *H04L 9/085* (2013.01); *H04L 9/0894* (2013.01); *H04L 9/304* (2013.01); *H04L 9/3242* (2013.01);
  (Continued)

(58) Field of Classification Search
  CPC . H04L 9/3247; H04L 63/062; H04L 63/0442; H04L 63/0435; H04L 9/3242; H04L 63/061; H04L 9/0631; H04L 9/304; H04L 9/0894; H04L 9/085; H04L 9/0643;
  (Continued)

(56) References Cited

U.S. PATENT DOCUMENTS

2015/0381350 A1* 12/2015 Joye ................... H04L 9/06
                                                         380/30
2016/0241391 A1*  8/2016 Fenster ............... H04L 9/085

FOREIGN PATENT DOCUMENTS

GB        2513260 A   * 10/2014   ............ G06F 21/40
GB        2520446         5/2015

OTHER PUBLICATIONS

Jen-Feng Huang ; Guey-Yun Chang ; Guo-Xun Hung; "A quorum-based channel hopping scheme for jamming resilience"; 2014 20th IEEE International Conference on Parallel and Distributed Systems (ICPADS); Year: Jul. 2014, Conference Paper, IEEE, pp. 1-4 (Year: 2014).*

* cited by examiner

*Primary Examiner* — Shewaye Gelagay
*Assistant Examiner* — Courtney D Fields
(74) *Attorney, Agent, or Firm* — Morris & Kamlay LLP

(57) ABSTRACT

Methods are described for constructing a secret key by multiple participants such that any quorum combination of participants can generate a fixed number of key components that can be combined by a recipient to generate the secret key. The methods permit an identical secret key to be generated by a different sized quorum from different participants if required. The keys may be used as private keys for encryption, decryption, digital signatures or authentication tokens and each key is generated from a key index. The circuits used by a quorum of participants for the generation of keys feature nested non-linear devices connected in series with outputs multiplied by stored secret values. Example applications are described including blinded cipher text generation, a multi-signature cryptocurrency system and an encrypted cloud storage system.

27 Claims, 22 Drawing Sheets

(51) Int. Cl.
   *H04L 9/08* (2006.01)
   *G06F 21/40* (2013.01)
   *H04L 9/32* (2006.01)
   *H04L 9/06* (2006.01)
   *G06F 11/14* (2006.01)
   *H04L 9/30* (2006.01)

(52) U.S. Cl.
   CPC ...... *H04L 63/0435* (2013.01); *H04L 63/0442* (2013.01); *H04L 63/061* (2013.01); *H04L 63/062* (2013.01); *H04L 63/065* (2013.01); *G06F 2221/2107* (2013.01); *H04L 2209/38* (2013.01)

(58) Field of Classification Search
   CPC ... H04L 63/065; H04L 2209/38; G06F 21/40; G06F 11/14; G06F 2221/2107
   See application file for complete search history.

MULTIPLE SECRETS IN QUORUM BASED DATA PROCESSING

FIELD OF THE INVENTION

This invention relates to data processing, and more particularly to systems and methods for quorum-based data processing.

BACKGROUND OF THE INVENTION

Generally, a quorum is defined as the minimum number of members of a group or society that must be present at any of its meetings to make the proceedings of that meeting valid. There are many everyday applications where a secret decryption key or code needs to be accessed without putting all the trust for its safekeeping in the hands of one person. It is desirable that the authorisation power of any one individual is limited and that a number of individuals need to participate together to generate the secret in a manner in which an individual does not learn the secret. It is also desirable that a number of different secrets may be generated securely without having to renew the secret information retained by the individuals. Any such system needs to be robust and not vulnerable to advances in high power computing coming for example from implementations of quantum computers.

STATEMENTS OF THE INVENTION

According to one aspect, the present invention provides a method or system for controlling access to stored encrypted data, wherein an encryption or decryption key is constructed from a predetermined, minimum number of secret quorum data sets. The quorum size is denoted by k. The system can generate a plurality of quorum data sets from which the encryption or decryption keys may be constructed. The number of quorum data sets generated may be based on the total number of participants, denoted as n. The fixed quorum number of data sets required to reconstruct the key is k. The required quorum number of data sets is a smaller number than the total number of participants and the quorum participants can be any of the participants. In the following the participants are referred to as players (or player devices), which may be hardware or software based equipment entities, under autonomous control or control by an associated individual.

The invention may be hardware based implemented for example as in Hardware Security Modules (HSM's) or implemented in software running on servers, desk top computers, mobile devices or implemented in a combination of hardware and software in cars, trains, aeroplanes or other platforms.

As well as encryption or decryption keys the invention may be used to generate quorum based passwords, authentication tokens or digital signatures. In the following description, the generic term "key" is used to denote such an encryption or decryption key, password, authentication token or digital signature key.

According to yet another aspect, the present invention provides a method of quorum-based data recovery, comprising generating a total of m randomly generated secret data values from which n data sets are calculated and distributed to each player who keeps their data set secret. Once the data sets are distributed the m randomly generated secret data values are permanently destroyed along with all copies. The n data sets are sets of m numbers or symbols which may be in any pre-selected number base with key construction calculations carried out using arithmetic or algebraic rules from a finite field or rational numbers including integers.

Each of the m values of the randomly generated secret data may be distributed amongst the n players by using the well documented technique known as polynomial secret sharing which is an example of Lagrange polynomial interpolation. An example is secret sharing. Each of the m values of randomly generated secret data is impressed on one or more coefficients of a polynomial of degree $k-1$. The other coefficients are randomly chosen. A typical implementation may have m equal to several hundred so that several hundred polynomials are generated. Each player is assigned a distinct value, a player index and a player's data set corresponds to the set of polynomials' values realised when the polynomials' variable is equal to the player's index value. For a quorum of k players each polynomial has degree $k-1$.

Each key may be given a distinct index value such as key 1, key 2, etc. The key index may be a label for the key. To generate the key itself the label value may be input to a circuit implementing a cascade of nested non-linear devices such as for example a series of devices with each device realising a hash function. The circuit can consist of several hundred nested non-linear devices, the number of devices corresponding to the value m. Each of the players is in possession of such a circuit implemented, for example, in hardware or simulated in software. When a quorum of k active players is formed, each active player uses their respective circuit to multiply each non-linear device input or output with a value from their data set multiplied by the appropriate Lagrange constant to form a single output after summation, referred to as a quorum portion, a key fragment or a key component. The key itself is constructed by combining all k player key components together.

In a further embodiment each player has multiple circuits and multiple data sets with all of the net circuit outputs combined together to form a single output for that player.

In other embodiments each non-linear device is an encryption circuit having its own encryption key or is a general non-linear device with multiple inputs used by the device.

An identical key, or a set of keys, can be generated by different embodiments using a different number of players to form a quorum. One embodiment may be used to generate a key used for encryption and a second embodiment may be used to generate the same key to be used for decryption. In these embodiments which generate identical keys the polynomials will usually not be the same. The polynomials can have different coefficients or even have a different degree. This means that a different size of quorum with a different number of players may be used to generate a key to be used for encryption compared to the size of quorum of players used to generate the same key to be used for decryption. It is possible for an embodiment to have a quorum of size one with a single player or entity such as an HSM generating the keys.

In some embodiments, the generated key may be used not as an encryption key but as the source for generating additional key material for use as encryption or decryption keys, authentication keys and initialisation vectors by employing one or more Key Derivation Functions (KDF's) on the generated key.

The quorum key generation may be used to generate an encryption key for encrypting a document or data file to produce a cipher text. Subsequently the same quorum process may be used to generate the decryption key needed to decrypt the cipher text back into the original data file or document.

The key index or label may itself be a data file or a portion of a data file or stream. The generated key may be used as a key for decrypting an encrypted data file or for accessing a secure unit, device or module.

The players may comprise one or more of: a computing device, an authentication token, a security dongle or interconnected hardware systems.

According to another aspect, the present invention provides a computer-implemented method of quorum-based data recovery, comprising generating a plurality of quorum data sets from said original data and a software based realisation of the nested non-linear circuits.

According to yet another aspect, the present invention provides a system for controlling access to data, wherein the data is encoded into a predefined number of quorum data sets based at least upon a predefined number of participants and a predefined minimum number of said participants that are required to access the data, whereby the original data can be recovered from any combination of said minimum number of quorum data sets.

A further embodiment ensures that the players, even if they all collude together, cannot know the final key that is produced. This is done by providing to the recipient additional, secret inputs to a key derivation function, which operates on the key collectively provided by the players, in order to produce the final key.

In further aspects, the present invention provides a system comprising means for performing the above methods. In yet other aspects, there is provided a computer program arranged to carry out the above methods when executed by a programmable device.

BRIEF DESCRIPTION OF THE DRAWINGS

There now follows, by way of example only, a detailed description of embodiments of the present invention, with references to the figures identified below.

DETAILED DESCRIPTION OF EMBODIMENTS OF THE INVENTION

A first embodiment of the invention will now be described for an example method of implementing quorum-based data processing within a secured computing or hardware environment, where recovery of sensitive data, such as a secret key or a secure data file, is only possible when a predefined minimum number of associated quorum key components are received from a corresponding quorum of available authorised participants. It will be appreciated that the embodiments described herein are applicable to many types and forms of secured computing and hardware environments and data processes carried out therein. As one example, the secured computing environment may facilitate secured access to encrypted data by a quorum of authorised personnel, such as selected directors and/or employees of a corporate entity, by reconstructing a decryption key based on quorum key components received from a quorum of authorised personnel. As another example, the secured computing environment may facilitate controlled access to the original secure data file, by reconstructing the original secret data based on quorum data received from a quorum of authorised personnel. As yet another example, the secured computing environment may facilitate access by a quorum of authenticated personnel to a product or service (e.g. a bank account, a secure web site), and/or a facility (e.g. via an electronic lock of a physical building, lab, vault, safe deposit box, critical infrastructure system, etc.). In such an example, the secret key would be used for authentication instead of decryption, where by coming together and providing the predetermined minimum number of quorum keys, the quorum participants can be authenticated to be allowed access to the secured assets. In further examples the secret key would be used for generating a digital signature, where by coming together and providing the predetermined minimum number of quorum key components, the quorum participants can sign off a commercial transaction or a block of transactions in crypto currency applications.

Figure 1:
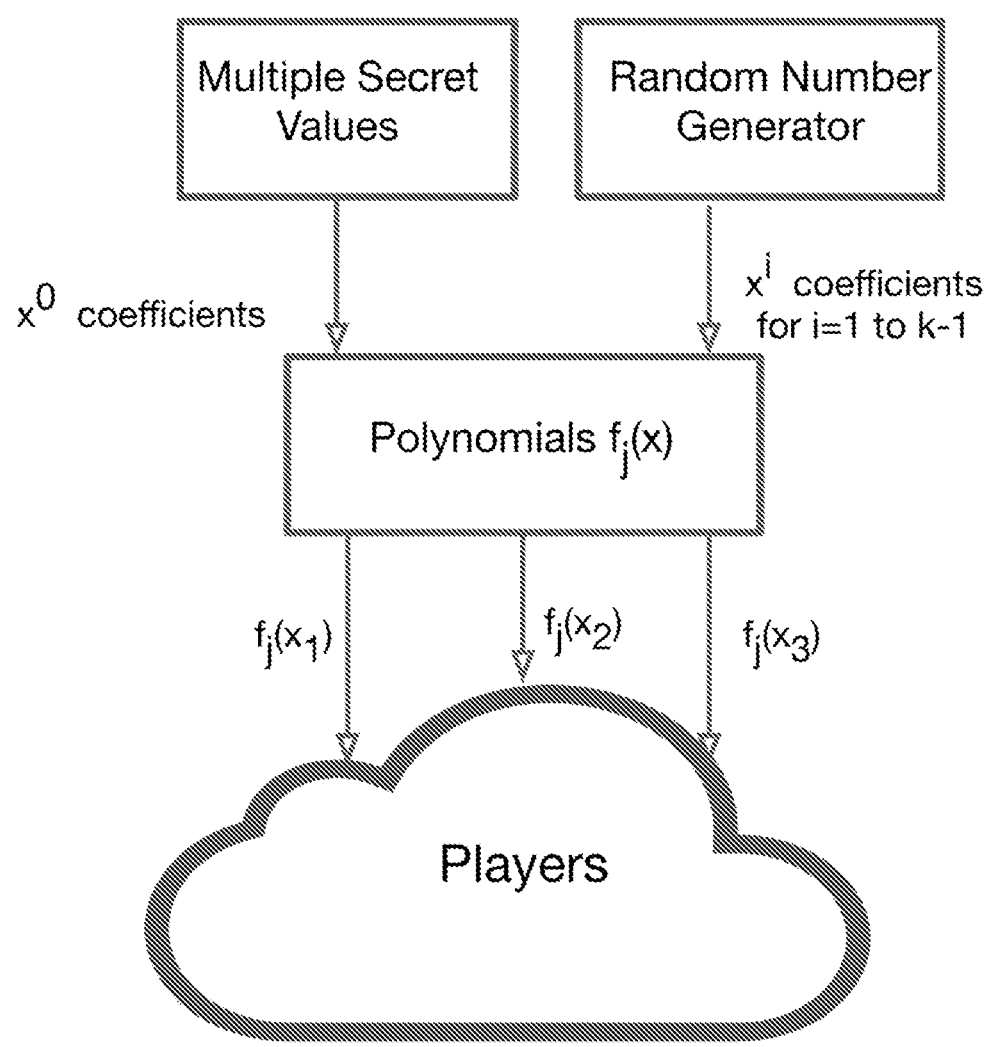
FIG. 1 is a block diagram showing the distribution of a set of multiple secret values to a number of players by means of multiple polynomials with one polynomial for each secret value.

In the set up stage similar for each embodiment a number or symbol base is firstly defined, such as a prime or prime power field or the set of rational numbers and multiple secret values are generated usually by a random number generator. Typically several hundred secret values may be generated. Each secret value defines one or more coefficients of a polynomial. In the following example each secret value defines the $x^0$ coefficient, but could define the $x^i$ coefficient or be split amongst coefficients. Referring to FIG. 1, each secret value defines the $x^0$ coefficient of a polynomial whose degree is k−1, where k is the number of players or participants that will make up the quorum. Each polynomial is defined as $$f_j(x) = S_j + r_1 x + r_2 x^2 + \ldots r_{k-1} x^{k-1}$$

where $S_j$ is the secret value and the coefficients $r_1$, $r_2$, $r_3$, $r_4 \ldots r_{k-1}$ are randomly chosen for each polynomial. The index j runs from 1 to m, where m is the total number of secret values. Each player is assigned a unique value, termed a player index and furthermore each player is sent, securely, their secret data set consisting of all of the polynomial values that result when x is set equal to their player index.

With n players and player indices $x_1$, $x_2$, $x_3$, $x_3 \ldots x_n$, Player 1 is sent the secret data set $f_1(x_1)$, $f_2(x_1)$, $f_3(x_1)$, $f_4(x_1)$, $f_5(x_1) \ldots f_m(x_1)$ a set of m numbers or symbols depending on the number base.
Player 2 is sent the secret data set $f_1(x_2)$, $f_2(x_2)$, $f_3(x_2)$, $f_4(x_2)$, $f_5(x_2) \ldots f_{1m}(x_2)$
Player 3 is sent the secret data set $f_1(x_3)$, $f_2(x_3)$, $f_3(x_3)$, $f_4(x_3)$, $f_5(x_3) \ldots f_{1m}(x_3)$
. . .
Player n is sent the secret data set $f_1(x_n)$, $f_2(x_n)$, $f_3(x_n)$, $f_4(x_n)$, $f_5(x_n) \ldots f_{1m}(x_n)$ The set up procedure is shown in schematic form in FIG. 1 for the case of three players. Considering as an example, the number field is a prime number field defined by the relatively small prime 33347. This is chosen for brevity in the following description, in practice a large prime would be used such as the following 257 bit prime 173945767739757183758335758926483679752559762465772783745016385623395764486307 Continuing the small prime 33347 example, the multiple secret values are 24273 9595 19002 24271 22367 12823

In this example the quorum size is chosen to be 3 so the polynomials are of degree 2. As there are 6 secret values in this example, there are 6 polynomials $$f_1(x) = 24273 + 16533x + 19657x^2$$

$$f_2(x) = 9595 + 27619x + 8215x^2$$

$$f_3(x) = 19002 + 7189x + 9280x^2$$

. . .

$$f_6(x) = 12823 + 18554x + 22732x^2$$

It will be noticed that the first coefficient of each successive polynomial is equal to the next value of the secret values. All other polynomial coefficients are randomly chosen modulo 33347.

In this example the player indices are 1, 2, 3, 4 and 5, the same as the player number but player indices may be chosen randomly as long as these are distinct from each other. The secret data set provided to Player 1 is $f_1(1)$, $f_2(1)$, $f_3(1)$, $f_4(1)$, $f_5(1)$ and $f_6(1)$, with all polynomial evaluations carried out modulo 33347. Accordingly the Player 1 data set is:
27116 12082 2124 18837 20640 20762
The secret data set provided to Player 2 is $f_1(2)$, $f_2(2)$, $f_3(2)$, $f_4(2)$, $f_5(2)$ and $f_6(2)$
Accordingly the Player 2 secret data set is:
2579 30999 3806 25597 21869 7471
Similarly the other player secret data sets are:
Player 3 17356 32999 24048 11204 26054 6297
Player 4 4753 18082 29503 9005 33195 17240
Player 5 31464 19595 20171 19000 9945 6953
Once these secret data sets are communicated to their respective players the original multiple secrets and the polynomials are permanently deleted together with all copies. The set up phase is now complete for the first embodiment.

Figure 2:
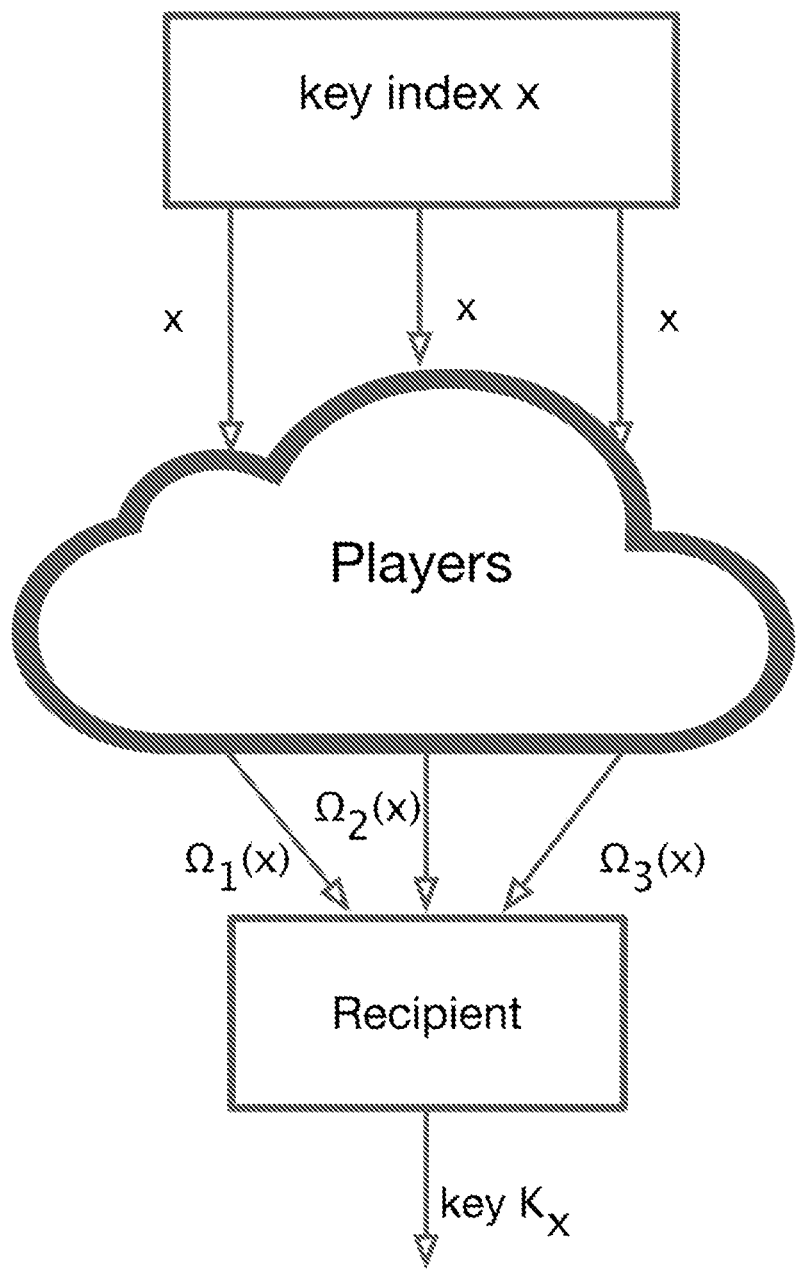
FIG. 2 is a block diagram showing a key index or label being sent to a quorum of players who each output key components enabling a recipient to construct a key according to the first embodiment of the invention.

The generation of a key is shown schematically in FIG. 2. The key index, x is sent to each of the quorum players who provides an output which is a function of the key index x, the player's secret data set and the indices of which players are forming the quorum set of players. FIG. 2 shows the case of a quorum of three active players who each output the key components $\Omega_1(x)$, $\Omega_2(x)$ and $\Omega_3(x)$.
Each player respectively sends their key component output to the recipient who combines these to form the key $K_x$.
Continuing the example above, consider that the players forming the quorum are players 1, 3 and 4 and the key index is x=19114. In this case
$\Omega_1(x) = 12071$ $\Omega_2(x) = 22204$ and $\Omega_3(x) = 25680$
and the outputs are summed modulo 33347 to produce $$K_x = \Omega_1(x) + \Omega_2(x) + \Omega_3(x) \bmod 33347 = 26608$$

If a different quorum set of players are involved, say players 1, 2 and 5 then
$\Omega_1(x) = 6752$ $\Omega_2(x) = 5333$ and $\Omega_3(x) = 14523$
and the outputs are summed modulo 33347 to produce $$K_x = \Omega_1(x) + \Omega_2(x) + \Omega_3(x) \bmod 33347 = 26608$$

Notice that the same key is produced despite the key components being different. Player 1 has a different output to before because a different set of player indices is involved causing the Player 1 Lagrange coefficient to change.

Figure 3:
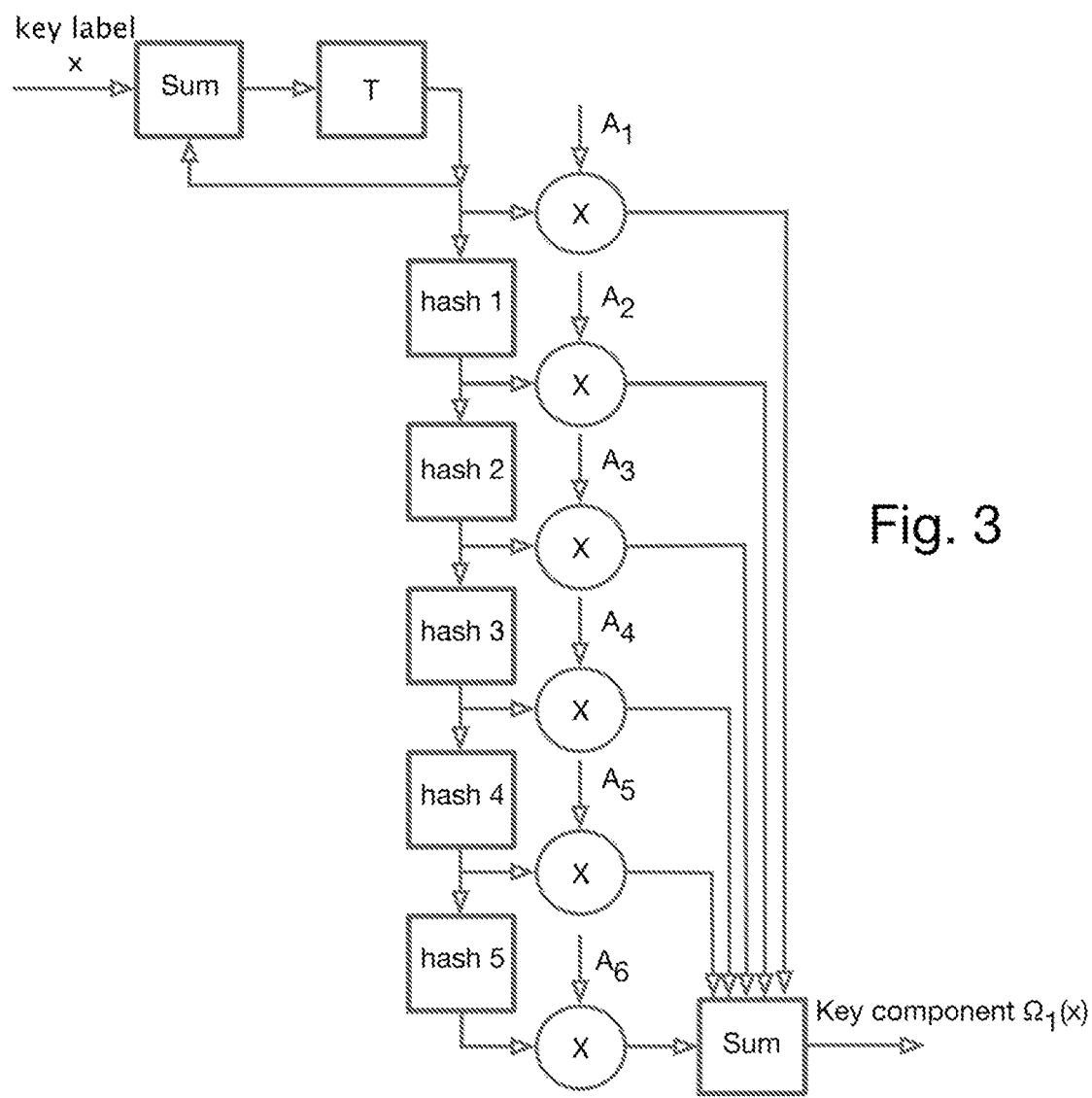
FIGS. 3 to 5 are block diagrams of a circuit used by each of three players consisting of a nested arrangement of non-linear devices connected in series, each implementing a different hash function operating on an input key label with outputs being multiplied by values from the player's data set pre-multiplied by the appropriate Lagrange constant before being summed to form a partial key according to a first embodiment of the invention.
Figure 4:
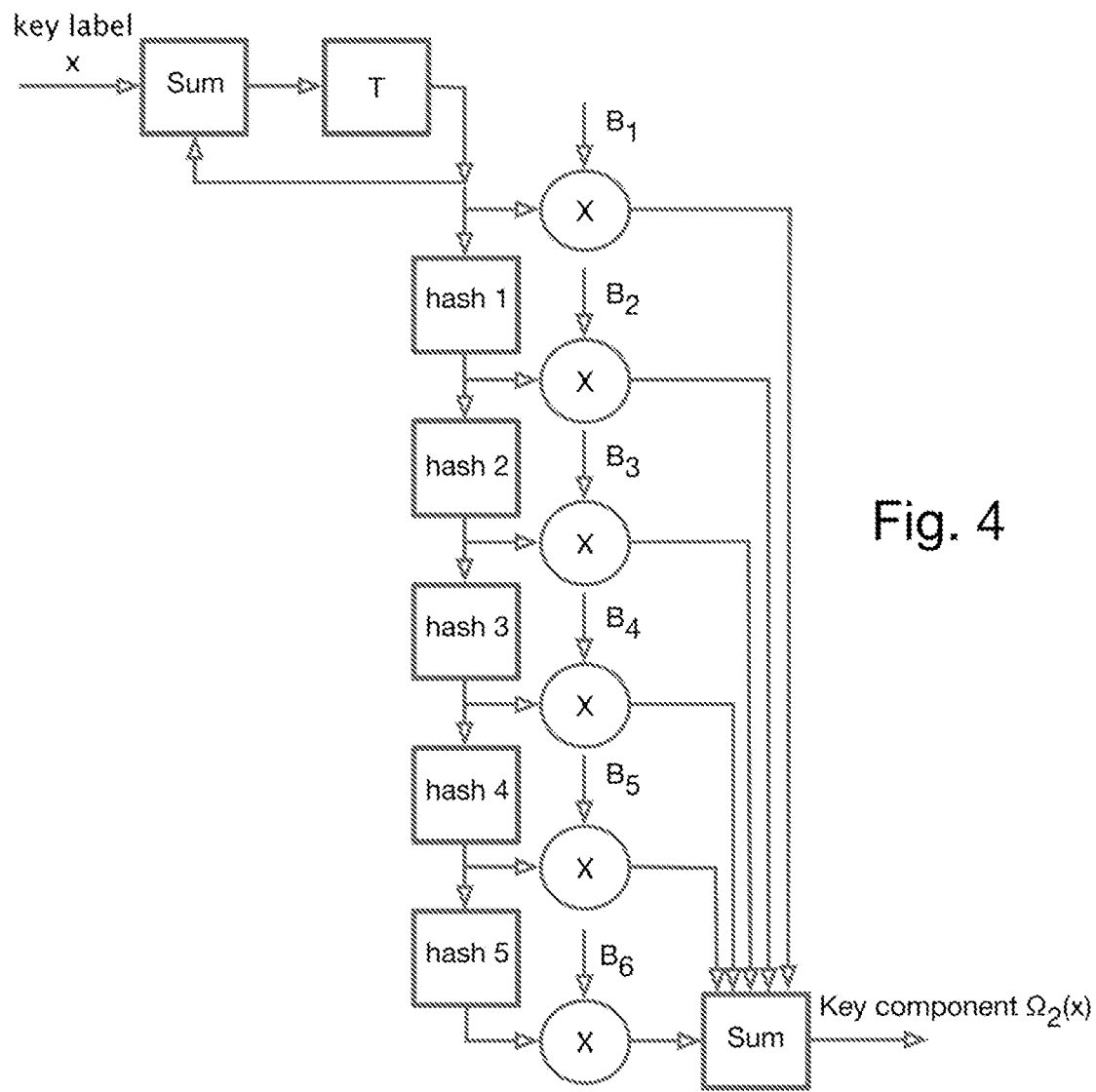
Figure 5:
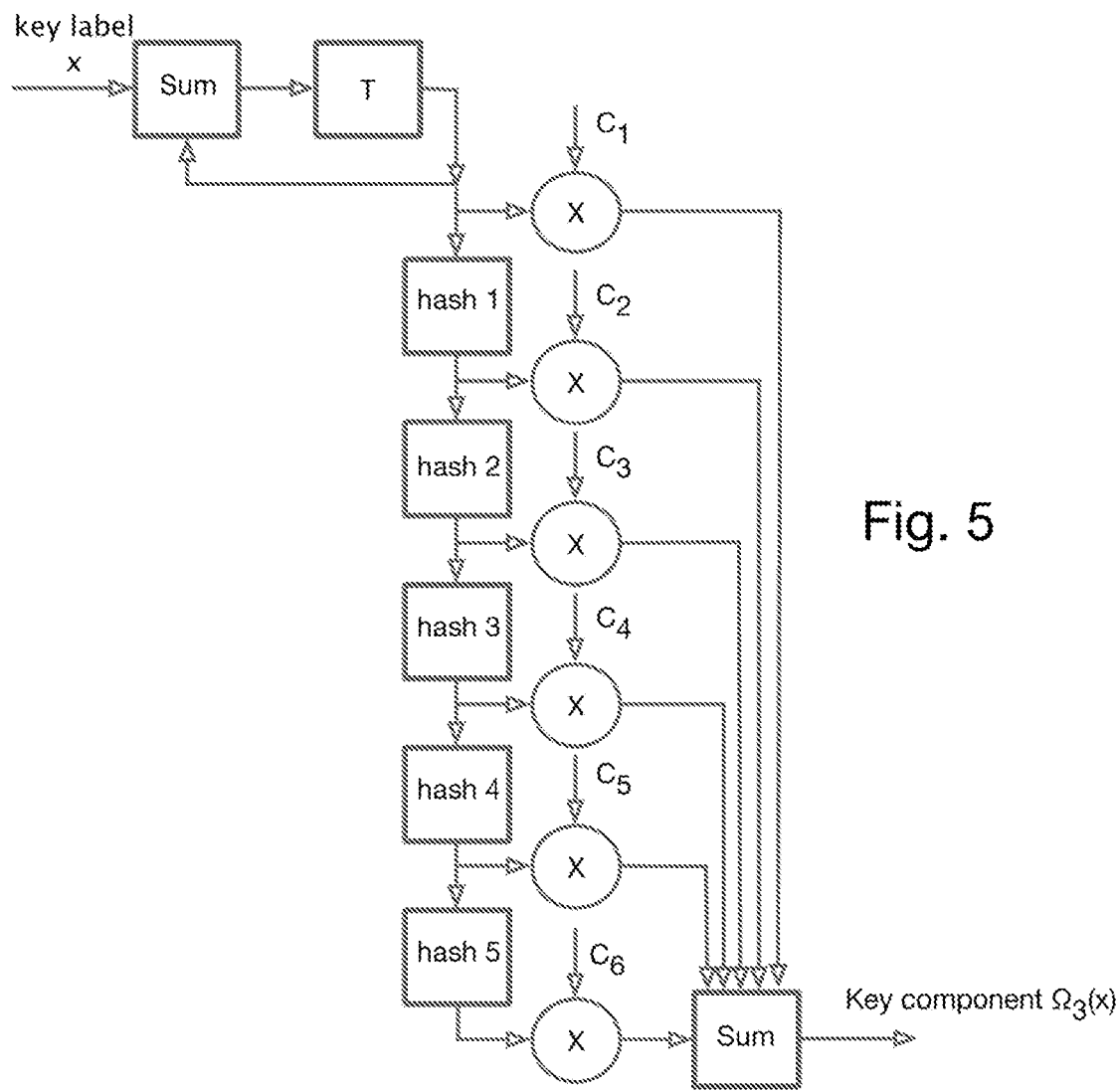

The circuits that are used to produce the three quorum player outputs in the first embodiment are shown in FIGS. 3, 4 and 5. In this example m is equal to 6. The circuits are identical except that key index and the m−1 hash function outputs are multiplied by $A_1$ to $A_m$ in FIG. 3, are multiplied by $B_1$ to $B_m$ in FIG. 4 and are multiplied by $C_1$ to $C_m$ in FIG. 5. The products are summed to produce the output of the circuit.

The parameters $A_1$ to $A_m$ are equal to $\lambda_{x1} \cdot f_1(x_1)$ to $\lambda_{x1} \cdot f_m(x_1)$ where the player's index is $x_1$ and $\lambda_{x1}$ is the Lagrange coefficient which is dependent on the other quorum player indices. Similarly the parameters $B_1$ to $B_m$ are equal to $\lambda_{x2} \cdot f_1(x_2)$ to $\lambda_{x2} \cdot f_m(x_2)$ where the player's index is $x_2$ and $\lambda_{x2}$ is the Lagrange coefficient dependent on the other participating quorum player indices.

Shown in FIG. 5, similarly the parameters $C_1$ to $C_m$ are equal to $\lambda_{x3} \cdot f_1(x_3)$ to $\lambda_{x3} \cdot f_m(x_3)$ where the player's index is $x_3$ and $\lambda_{x3}$ is the Lagrange coefficient.

As an example for a quorum of 3, the Lagrange coefficients are:

$$\lambda_{x1} = \frac{x2 \cdot x3}{(x1-x2)(x1-x3)},$$

$$\lambda_{x2} = \frac{x1 \cdot x3}{(x2-x1)(x2-x3)} \text{ and } \lambda_{x3} = \frac{x1 \cdot x2}{(x3-x2)(x3-x1)}$$

For the example above with player indices 1, 3 and 4

$$\lambda_{x1} = \frac{3 \cdot 4}{(1-3)(1-4)} = 2,$$

$$\lambda_{x2} = \frac{1 \cdot 4}{(3-1)(3-4)} = -2 \text{ and } \lambda_{x3} = \frac{1 \cdot 3}{(4-3)(4-1)} = 1$$

Figure 6:
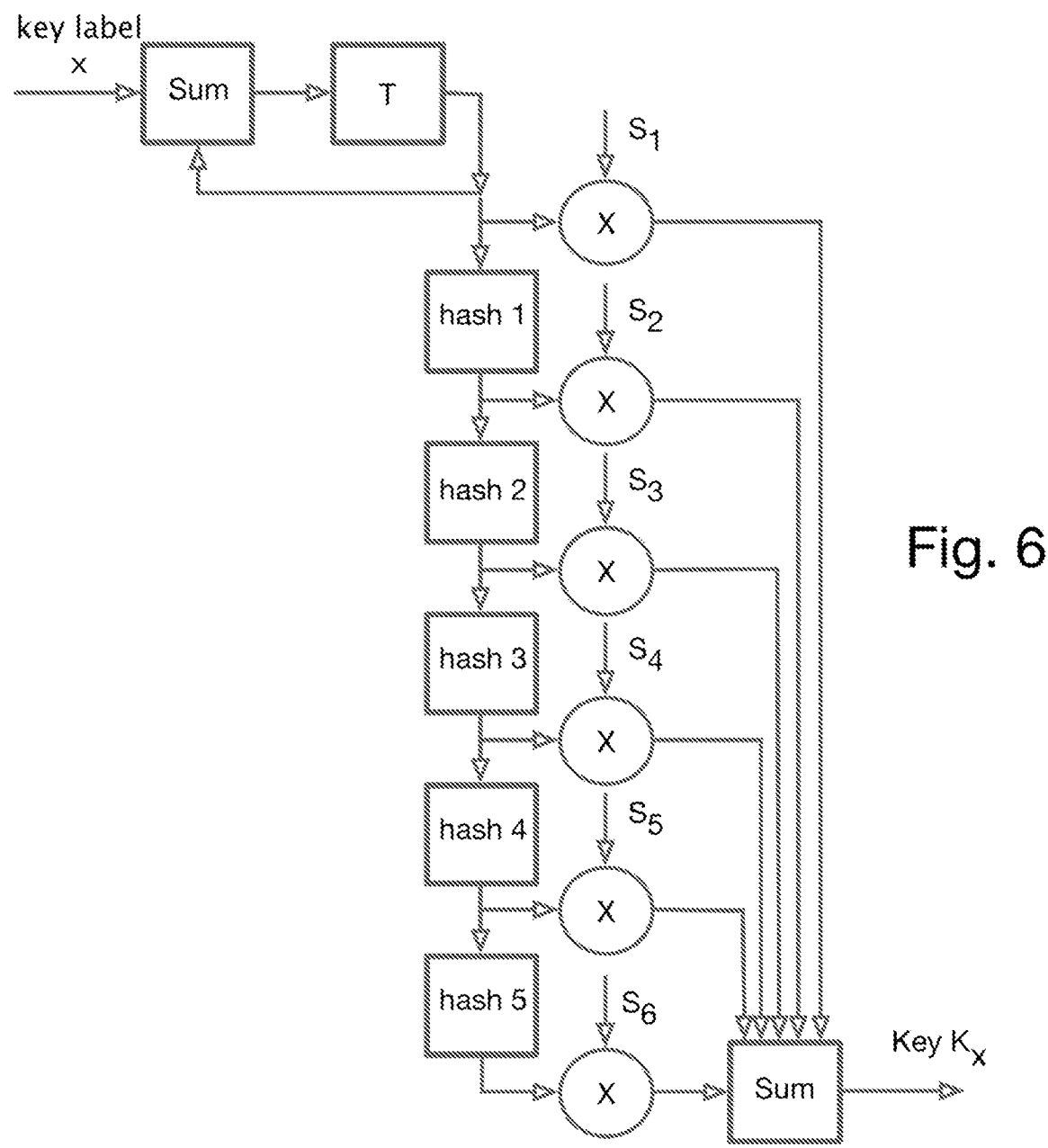
FIG. 6 is a block diagram of a circuit consisting of a nested arrangement of non-linear devices, each implementing a different hash function operating on an input key label with outputs being multiplied by different values before being summed to form a key according to a second embodiment of the invention.

The input to the circuits is the index of the key to be generated. This is denoted as x, which may have any value within the range of symbols or numbers defined at the set up stage. The index x is followed by zeros and the single delay feedback shift register stage ensures that x is still input to the hash 1 device at the time the hash 5 output is formed. At this point all of the nested hash function outputs are available. The hash outputs are respectively multiplied by $A_1$ to $A_m$ and summed to produce the output $\Omega_1(x)$. Denoting the function of hash 1 as $h_1(x)$, hash 2 as $h_2(x)$, and so on so that the circuit of FIG. 3 produces the output $\Omega_1(x) = x \cdot A_1 + h_1(x) \cdot A_2 + h_2(h_1(x)) \cdot A_3 + h_3(h_2(h_1(x))) \cdot A_4 + h_4(h_3(h_2(h_1(x)))) \cdot A_5 + h_5(h_4(h_3(h_2(h_1(x))))) \cdot A_6$ It would seem unlikely that a series of non-linear devices executing a series of different hash functions being multiplied by different numbers would produce the correct key component independently of which quorum combination of players is being used. However this is shown to be true by considering the second embodiment which is shown in FIG. 6. This is the embodiment for a quorum consisting of just one player. Consequently k=1 and the polynomials are of degree k-1=0. With the same example as before the 6 polynomials are $$f_1(x) = 24273$$

$$f_2(x) = 9595$$

$$f_3(x) = 19002$$

$$\ldots$$

$$f_6(x) = 12823$$

Independent of the player index chosen, e.g. x=1, the secret data set provided to Player 1 is $f_1(1), f_2(1), f_3(1), f_4(1), f_5(1)$ and $f_6(1)$. Accordingly the Player 1 data set is:
24273 9595 19002 24271 22367 12823

This is the same as the original set of multiple secret values. Referring to FIG. 6, for this example $S_1=24273$, $S_2=9595$, $S_3=19002$. $S_4=24271$, $S_5=22367$ and $S_6=12823$ As before denoting the function of hash 1 as $h_1(x)$, hash 2 as $h_2(x)$, and so on the output of the circuit shown in FIG. 6 is $K_x = x \cdot S_1 + h_1(x) \cdot S_2 + h_2(h_1(x)) \cdot S_3 + h_3(h_2(h_1(x))) \cdot S_4 + h_4(h_3(h_2(h_1(x)))) \cdot S_5 + h_5(h_4(h_3(h_2(h_1(x))))) \cdot S_6$ Considering the example above, x=19114, and the same values of $S_1$ to $S_6$, $K_x=26608$ Referring back to the first embodiment, and FIG. 3

$\Omega_1(x) = x \cdot A_1 + h_1(x) \cdot A_2 + h_2(h_1(x)) \cdot A_3 + h_3(h_2(h_1(x))) \cdot A_4 + h_4(h_3(h_2(h_1(x)))) \cdot A_5 + h_5(h_4(h_3(h_2(h_1(x))))) \cdot A_6$ For FIG. 4

$\Omega_2(x) = x \cdot B_1 + h_1(x) \cdot B_2 + h_2(h_1(x)) \cdot B_3 + h_3(h_2(h_1(x))) \cdot B_4 + h_4(h_3(h_2(h_1(x)))) \cdot B_5 + h_5(h_4(h_3(h_2(h_1(x))))) \cdot B_6$ For FIG. 5

$\Omega_3(x) = x \cdot C_1 + h_1(x) \cdot C_2 + h_2(h_1(x)) \cdot C_3 + h_3(h_2(h_1(x))) \cdot C_4 + h_4(h_3(h_2(h_1(x)))) \cdot C_5 + h_5(h_4(h_3(h_2(h_1(x))))) \cdot C_6$ Note that with the properties of Lagrange polynomial interpolation $A_1+B_1+C_1=S_1$, $A_2+B_2+C_2=S_2$, $A_3+B_3+C_3=S_3$, $A_4+B_4+C_4=S_4$, $A_5+B_5+C_5=S_5$ and $A_6+B_6+C_6=S_6$ The sum of the key components produced by the three quorum players $$\Omega_1(x) + \Omega_2(x) + \Omega_3(x) =$$
$$x \cdot (A_1+B_1+C_1) + h_1(x) \cdot (A_2+B_2+C_2) + h_2(h_1(x)) \cdot (A_3+B_3+C_3) +$$
$$\ldots = x \cdot S_1 + h_1(x) \cdot S_2 + h_2(h_1(x)) \cdot S_3 +$$
$$h_3(h_2(h_1(x))) \cdot S_4 + h_4(h_3(h_2(h_1(x)))) \cdot S_5 + \ldots = K_x$$

Consequently starting with the same multiple secret values, embodiment 1 produces the same key as embodiment 2, regardless of which particular combination of players form a quorum.

In the first and second embodiments the hash functions $h_1(x)$ to $h_{m-1}(x)$ should preferably be kept secret. These should be routinely changed in order to ensure the security of the quorum encryption system. For a series of key indices $y_1, y_2, y_3, y_4, y_5 \ldots y_m$ the quorum keys produced are $K_{y1}, K_{y2}, K_{y3}, K_{y4}, K_{y5} \ldots K_{ym}$ and these keys are fully independent of each other. Even if all the hash functions plus the key indices $y_1, y_2, y_3, y_4, y_5 \ldots y_{m-1}$ plus all of the keys $K_{y1}, K_{y2}, K_{y3}, K_{y4}, K_{y5} \ldots K_{ym-1}$ are known by an attacker, the attacker cannot narrow the choices for $K_{ym}$ knowing key index $y_m$. This is because the secret data set $S_1$ to $S_m$ consists of m unknown values. In addition to knowing the hash functions and the key indices, the attacker needs to know at least m quorum keys before being able to learn any of the values $S_1$ to $S_m$. If the attacker does know the hash functions $h_1(x)$ to $h_{m-1}(x)$, he or she has to rely on these remaining constant. If any one or more of these hash functions are changed before m quorum keys have been output since the last change of these hash functions, the attacker cannot improve on just guessing the value of the next output quorum key, even having all of that prior knowledge.

Figure 7:
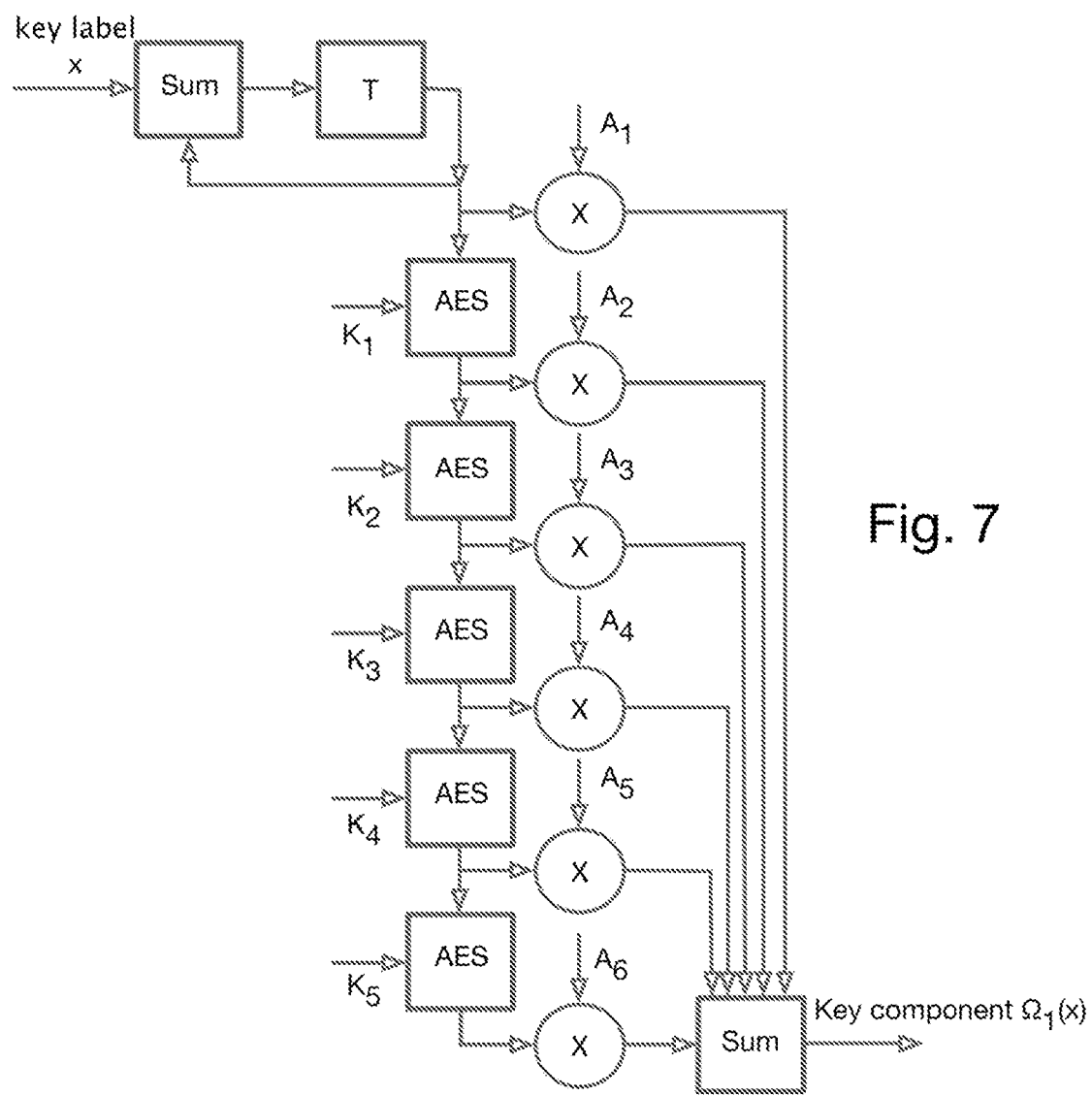
FIGS. 7 to 9 are block diagrams of a circuit used by each of three players consisting of a nested arrangement of Advanced Encryption Standard (AES) encryption devices, each using a different encryption key, operating on an input key label with outputs being multiplied by values from the player's data set pre-multiplied by the appropriate Lagrange constant before being summed to form a key component according to a third embodiment of the invention.
Figure 8:
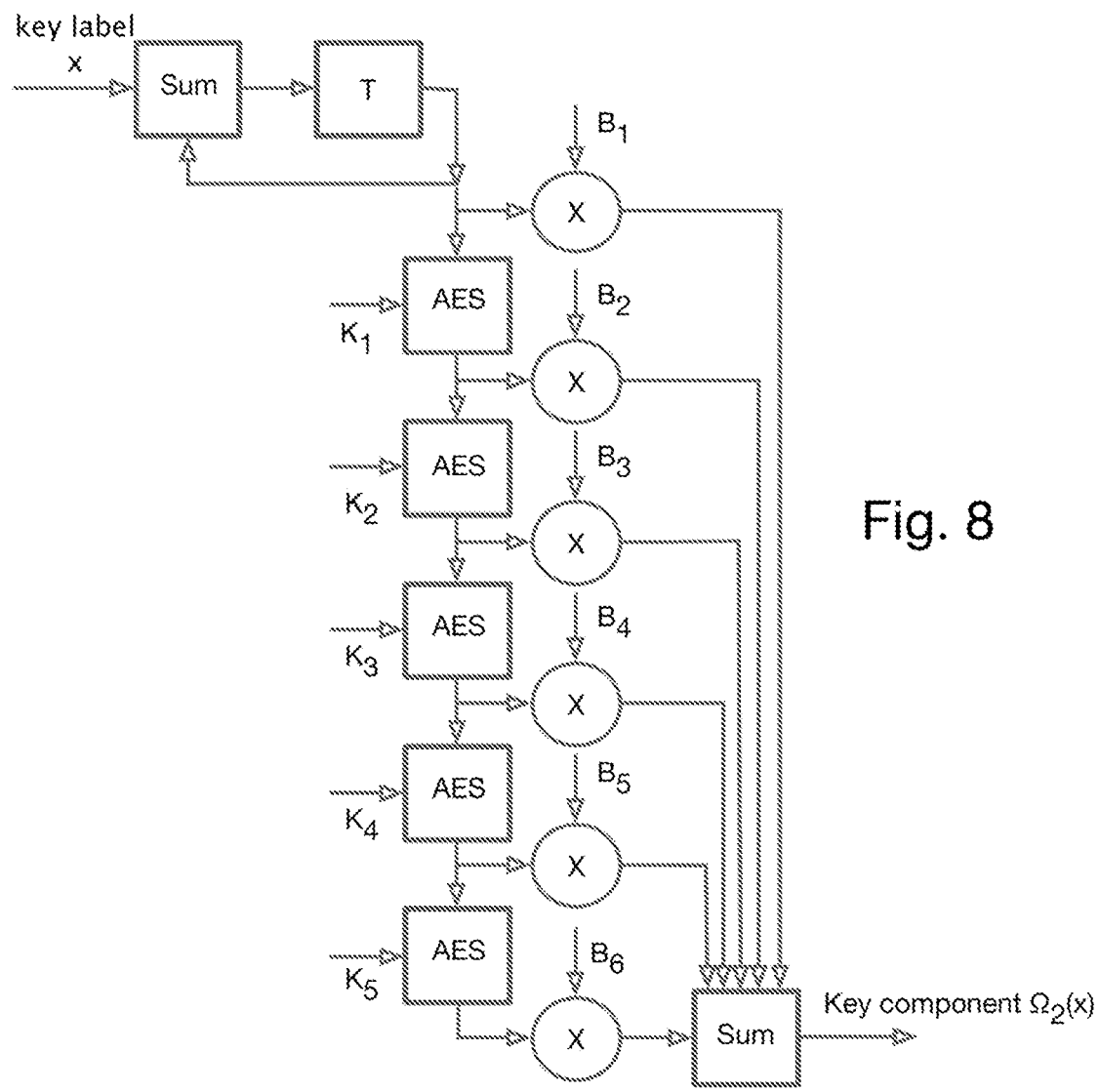
Figure 9:
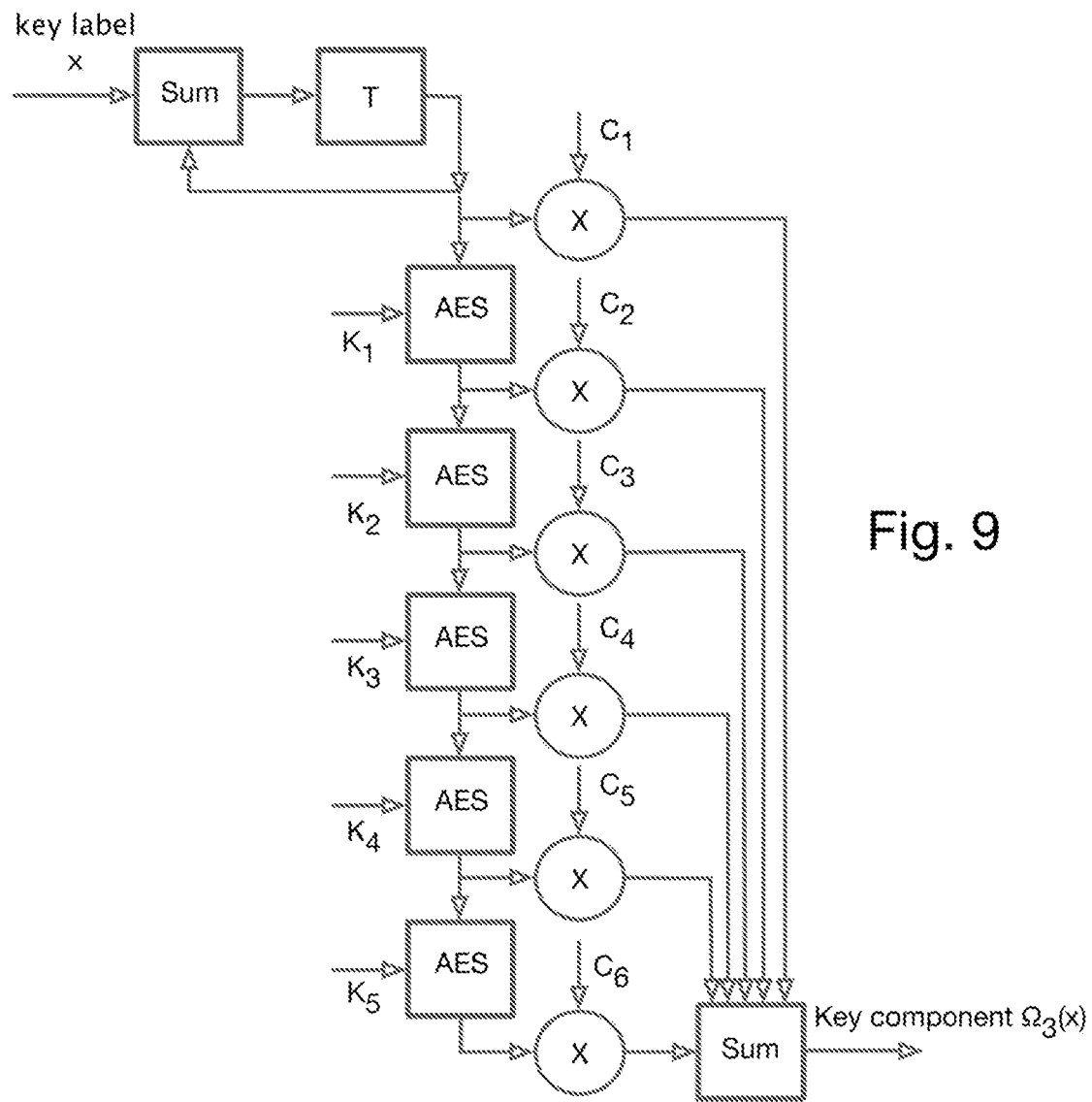

An example of a well proven method of symmetric key encryption is the Advanced Encryption Standard (AES), as defined in Federal Information Processing Standards Publication 197, United States National Institute of Standards and Technology (NIST), Nov. 26, 2001. AES is an example of an symmetric encryption system where there is a secret key that is used to encrypt the plaintext into ciphertext. The third embodiment utilises nested AES encryption devices instead of hash functions as shown in FIGS. 7 to 9. Each AES encryption device has its own key. Denoting the AES encryption output as $AES_k(x)$ for encryption key k and input x, the output of the circuit shown in FIG. 7 is $$\Omega_1(x)=x \cdot A_1+AES_{k1}(x) \cdot A_2+AES_{k2}(AES_{k1}(x)) \cdot A_3+ \\ AES_{k3}(AES_{k2}(AES_{k1}(x))) \cdot A_4+AES_{k4}(AES_{k3} \\ (AES_{k2}(AES_{k1}(x)))) \cdot A_5+AES_{k5}(AES_{k4}(AES_{k3} \\ (AES_{k2}(AES_{k1}(x))))) \cdot A_6$$

Similarly the output of the circuit shown in FIG. 8 is $$\Omega_2(x)=x \cdot B_1+AES_{k1}(x) \cdot B_2+AES_{k2}(AES_{k1}(x)) \cdot B_3+ \\ AES_{k3}(AES_{k2}(AES_{k1}(x))) \cdot B_4+AES_{k4}(AES_{k3} \\ (AES_{k2}(AES_{k1}(x)))) \cdot B_5+AES_{k5}(AES_{k4}(AES_{k3} \\ (AES_{k2}(AES_{k1}(x))))) \cdot B_6$$

Similarly the output of the circuit shown in FIG. 9 is $$\Omega_3(x)=x \cdot C_1+AES_{k1}(x) \cdot C_2+AES_{k2}(AES_{k1}(x)) \cdot C_3+ \\ AES_{k3}(AES_{k2}(AES_{k1}(x))) \cdot C_4+AES_{k4}(AES_{k3} \\ (AES_{k2}(AES_{k1}(x)))) \cdot C_5+AES_{k5}(AES_{k4}(AES_{k3} \\ (AES_{k2}(AES_{k1}(x))))) \cdot C_6$$

With this embodiment, again as shown in FIG. 2, the key component outputs $\Omega_1(x)$, $\Omega_2(x)$ and $\Omega_3(x)$ are summed together to produce $$\Omega_1(x)+\Omega_2(x)+\Omega_3(x)=x \cdot (A_1+B_1+C_1)+AES_{k1}(x) \cdot (A_2+ \\ B_2+C_2)+AES_{k2}(AES_{k1}(x)) \cdot (A_3+B_3+C_3)+AES_{k3} \\ (AES_{k2}(AES_{k1}(x))) \cdot (A_4+B_4+C_4)+AES_{k4}(AES_{k3} \\ (AES_{k2}(AES_{k1}(x)))) \cdot (A_5+B_5+C_5)+AES_{k5}(AES_{k4} \\ (AES_{k3}(AES_{k2}(AES_{k1}(x))))) \cdot (A_6+B_6+C_6)=K_x$$

As before the properties of Lagrange polynomial interpolation ensure that $A_1+B_1+C_1=S_1$, $A_2+B_2+C_2=S_2$, $A_3+B_3+C_3=S_3$, $A_4+B_4+C_4=S_4$, $A_5+B_5+C_5=S_5$ and $A_6+B_6+C_6=S_6$
The sum of the key components produced by the three quorum players $$x \cdot S_1+AES_{k1}(x) \cdot S_2+AES_{k2}(AES_{k1}(x)) \cdot S_3+AES_{k3} \\ (AES_{k2}(AES_{k1}(x))) \cdot S_4+AES_{k4}(AES_{k3}(AES_{k2} \\ (AES_{k1}(x)))) \cdot S_5+AES_{k5}(AES_{k4}(AES_{k3}(AES_{k2} \\ (AES_{k1}(x))))) \cdot S_6=K_x$$

Figure 10:
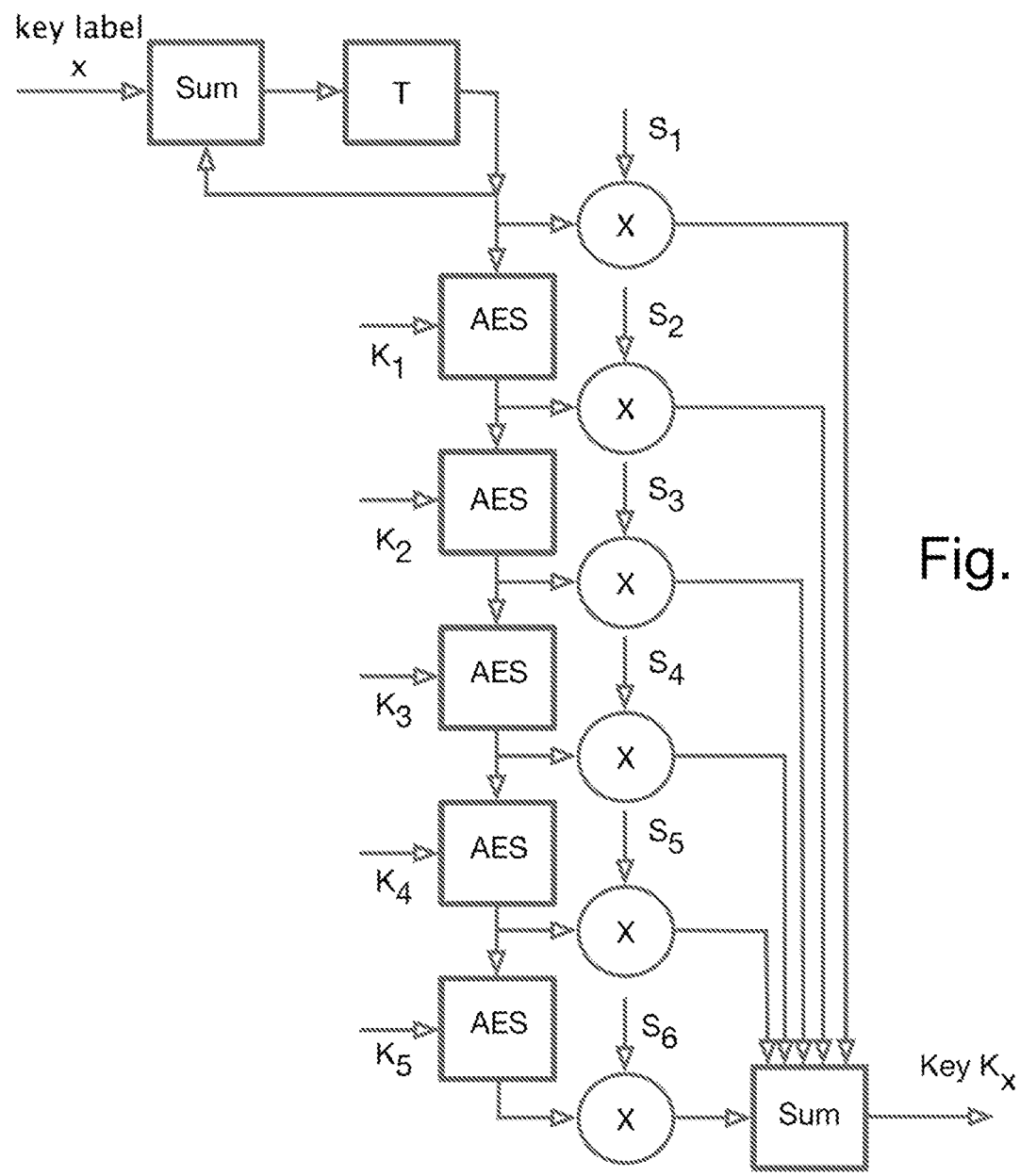
FIG. 10 is a block diagram of a circuit consisting of a nested arrangement of AES encryption devices, each using a different encryption key operating on an input key label with outputs being multiplied by different values before being summed to form a key according to a fourth embodiment of the invention.

With the properties of Lagrange polynomial interpolation the sum of the key components produced by the three quorum players, $K_x$ is the same key regardless of which combination of three players of the n players form the quorum.
The key $K_x$ is the same key that is produced by the circuit for the fourth embodiment, which is shown in FIG. 10, because the circuit features nested AES encryption for a quorum of one player. As in the second embodiment, when k=1, the polynomials are all degree 0 and the player's data set, the value of the polynomials (for any player index value) is the same as the original set of multiple secret values $S_1$ to $S_m$. Accordingly the output of the circuit shown in FIG. 10 is $x \cdot S_1+AES_{k1}(x) \cdot S_2+AES_{k2}(AES_{k1}(x)) \cdot S_3+AES_{k3}(AES_{k2}(AES_{k1}(x))) \cdot S_4+AES_{k4}(AES_{k3}(AES_{k2}(AES_{k1}(x)))) \cdot S_5+AES_{k5}(AES_{k4}(AES_{k3}(AES_{k2}(AES_{k1}(x))))) \cdot S_6=K_x$ Similar to the earlier embodiments, in the third and fourth embodiments the secret AES encryption keys $k_1$ to $k_{m-1}$ should be routinely changed in order to ensure the security of the quorum encryption system. For a series of key indices $y_1, y_2, y_3, y_4, y_5 \ldots y_m$ the quorum keys produced are $K_{y1}, K_{y2}, K_{y3}, K_{y4}, K_{y5} \ldots K_{ym}$ and these keys are fully independent of each other. Even if all the AES encryption keys plus the key indices $y_1, y_2, y_3, y_4, y_5 \ldots y_{m-1}$ and all of the keys $K_{y1}, K_{y2}, K_{y3}, K_{y4}, K_{y5} \ldots K_{ym-1}$ are known by an attacker, the attacker cannot narrow the choices for $K_{ym}$ knowing key index $y_m$. This is because the secret data set $S_1$ to $S_m$ consists of m unknown values. In addition to all of the key information, the attacker needs to know at least m quorum keys before being able to learn any of the values $S_1$ to $S_m$. If any one or more of these AES keys are changed before m quorum keys have been output since the last setting of AES encryption keys, the attacker cannot improve on just guessing the value of the next output quorum key, even knowing all of the previous output quorum keys.

Figure 11:
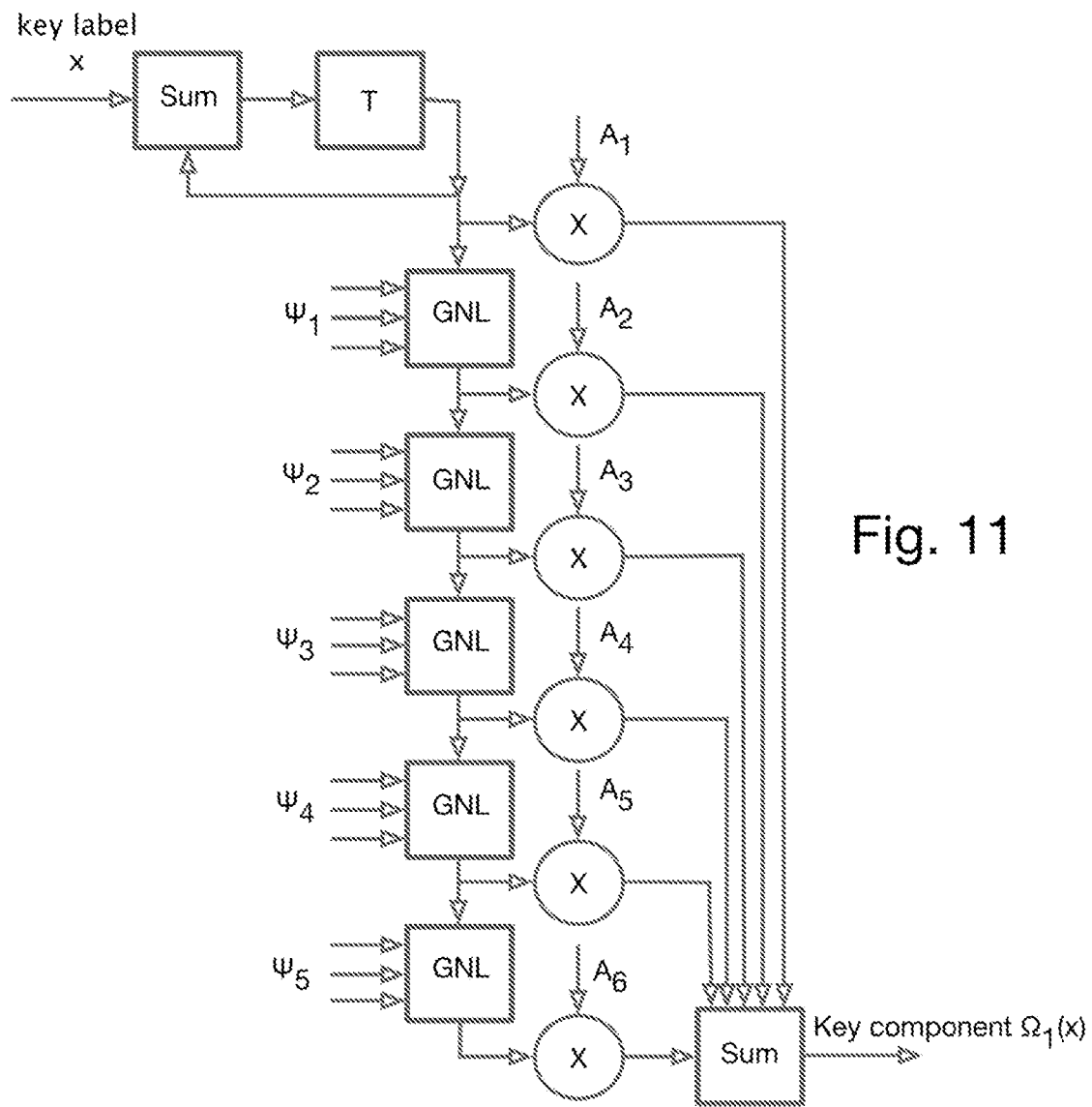
FIGS. 11 to 13 are block diagrams of a circuit used by each of three players consisting of a nested arrangement of General Non-Linear (GNL) devices, each having three additional inputs, operating on an input key label with outputs being multiplied by values from the player's data set weighted by the appropriate Lagrange constant before being summed to form a partial key according to a fifth embodiment of the invention.

The fifth embodiment utilises nested Generalised Non-Linear (GNL) devices which is a generic name for a device that contains an arbitrary predetermined mapping function which maps input values to an output value. This may be implemented as a look up table, a look up table combined with a processor or as non-linear hardware electronics. The nested use of these devices is shown in the circuits shown in FIGS. 11 to 13. Each GNL device has its own set of multiple inputs denoted as $\psi_1$ to $\psi_5$ in addition to the input connected to the output from the previous GNL device. The multiple inputs denoted as $\psi_1$ to $\psi_5$ would normally be constants or periodically changing values. Denoting the GNL device output as $GNL_\psi(x)$ for multiple inputs $\psi$ and input variable x, the output of the circuit used by one of the three quorum players shown in FIG. 11 is $$(x)=x \cdot A_1+GNL_{\psi 1}(x) \cdot A_2+GNL_{\psi 2}(GNL_{\psi 1}(x)) \cdot A_3+ \\ GNL_{\psi 3}(GNL_{\psi 2}(GNL_{\psi 1}(x))) \cdot A_4+GNL_{\psi 4}(GNL_{\psi 3} \\ (GNL_{\psi 2}(GNL_{\psi 1}(x)))) \cdot A_5+GNL_{\psi 5}(GNL_{\psi 4} \\ (GNL_{\psi 3}(GNL_{\psi 2}(GNL_{\psi 1}(x))))) \cdot A_6$$

Figure 12:
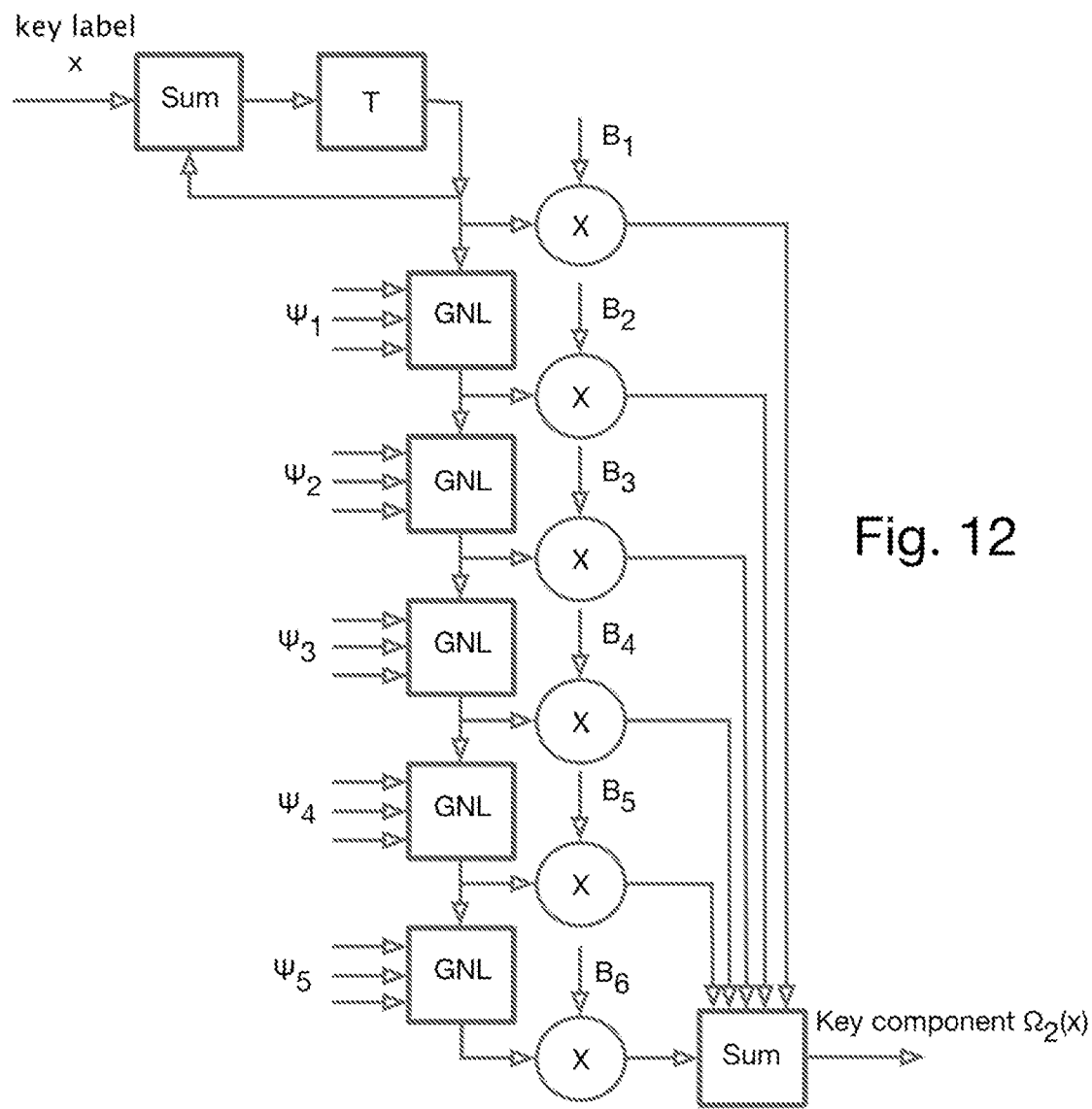

Similarly another quorum player using the circuit shown in FIG. 12 produces the output:

$$\Omega_2(x)=x \cdot B_1+GNL_{\psi 1}(x) \cdot B_2+GNL_{\psi 2}(GNL_{\psi 1}(x)) \cdot B_3+ \\ GNL_{\psi 3}(GNL_{\psi 2}(GNL_{\psi 1}(x))) \cdot B_4+GNL_{\psi 4}(GNL_{\psi 3} \\ (GNL_{\psi 2}(GNL_{\psi 1}(x)))) \cdot B_5+GNL_{\psi 5}(GNL_{\psi 4} \\ (GNL_{\psi 3}(GNL_{\psi 2}(GNL_{\psi 1}(x))))) \cdot B_6$$

Figure 13:
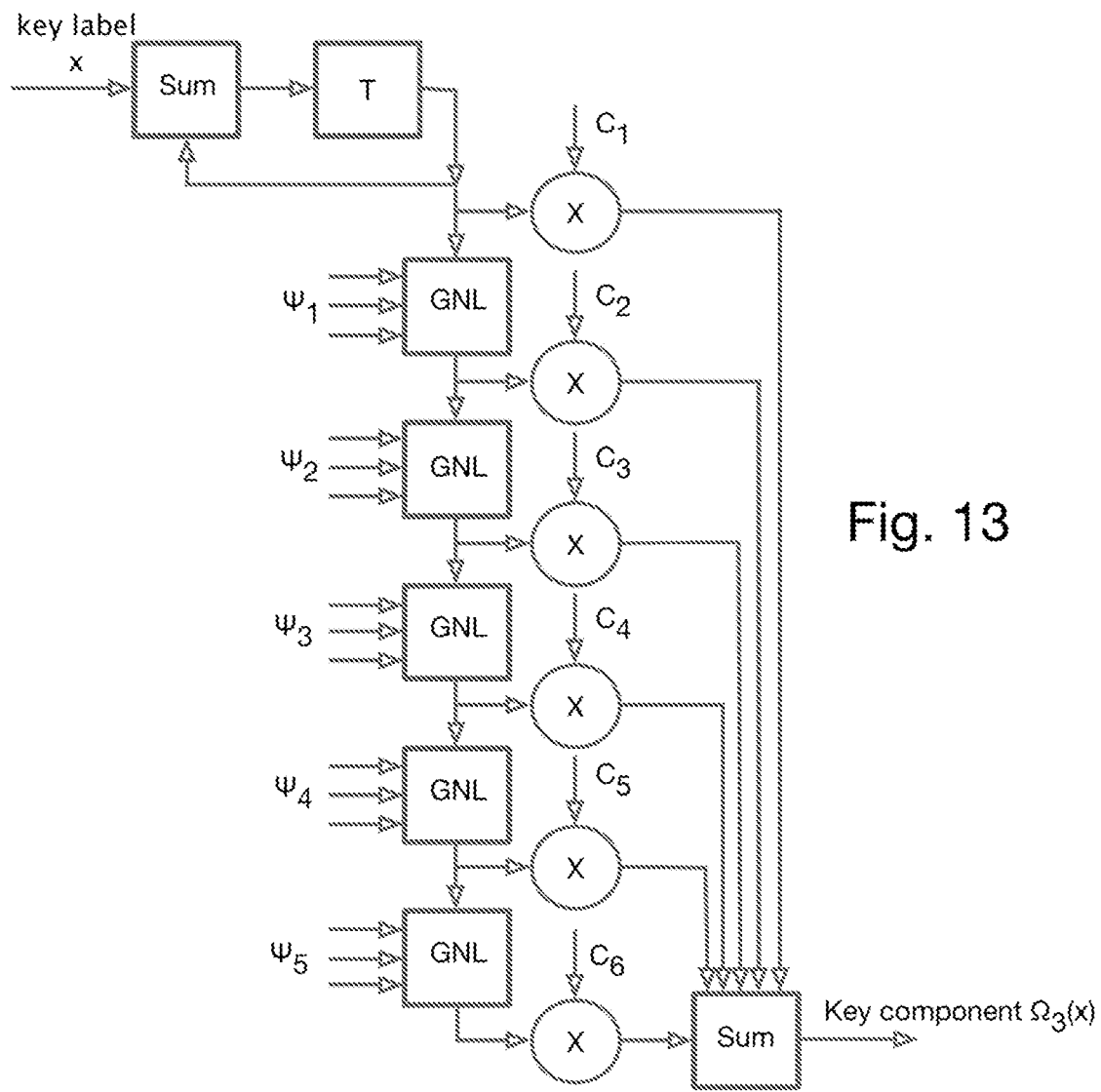

As in this example the quorum is formed from three active players, the third player uses the circuit shown in FIG. 13 to produce the output $$\Omega_3(x)=x \cdot C_1+GNL_{\psi 1}(x) \cdot C_2+GNL_{\psi 2}(GNL_{\psi 1}(x)) \cdot C_3+ \\ GNL_{\psi 3}(GNL_{\psi 2}(GNL_{\psi 1}(x))) \cdot C_4+GNL_{\psi 4}(GNL_{\psi 3} \\ (GNL_{\psi 2}(GNL_{\psi 1}(x)))) \cdot C_5+GNL_{\psi 5}(GNL_{\psi 4} \\ (GNL_{\psi 3}(GNL_{\psi 2}(GNL_{\psi 1}(x))))) \cdot C_6$$

The three active player key component outputs are added together as shown in FIG. 2 to produce $\Omega_1(x)+\Omega_2(x)+\Omega_3(x)=x(A_1+B_1+C_1)+GNL_{\psi 1}(x) \cdot (A_2+B_2+C_2)+GNL_{\psi 2}(GNL_{\psi 1}(x)) \cdot (A_3+B_3+C_3)+GNL_{\psi 3}$ $(GNL_{\psi 2}$ $(GNL_{\psi 1}(x))) \cdot (A_4+B_4+C_4)+GNL_{\psi 4}(GNL_{\psi 3}$ $(GNL_{\psi 2}$ $(GNL_{\psi 1}(x)))) \cdot (A_5+B_5+C_5)+GNL_{\psi 5}(GNL_{\psi 4}(GNL_{\psi 3}(GNL_{\psi 2}(GNL_{\psi 1}(x))))) \cdot (A_6+B_6+C_6)$ As before the properties of Lagrange polynomial interpolation ensure that $A_1+B_1+C_1=S_1$, $A_2+B_2+C_2=S_2$, $A_3+B_3+C_3=S_3$, $A_4+B_4+C_4=S_4$, $A_5+B_5+C_5=S_5$ and $A_6+B_6+C_6=S_6$
The sum of the key components produced by the three quorum players is $$x \cdot S_1+GNL_{\psi 1}(x) \cdot S_2+GNL_{\psi 2}(GNL_{\psi 1}(x)) \cdot S_3+GNL_{\psi 3} \\ (GNL_{\psi 2}(GNL_{\psi 1}(x))) \cdot S_4+GNL_{\psi 4}(GNL_{\psi 3}(GNL_{\psi 2} \\ (GNL_{\psi 1}(x)))) \cdot S_5+GNL_{\psi 5}(GNL_{\psi 4}(GNL_{\psi 3} \\ (GNL_{\psi 2}(GNL_{\psi 1}(x))))) \cdot S_6=K_x$$

Figure 14:
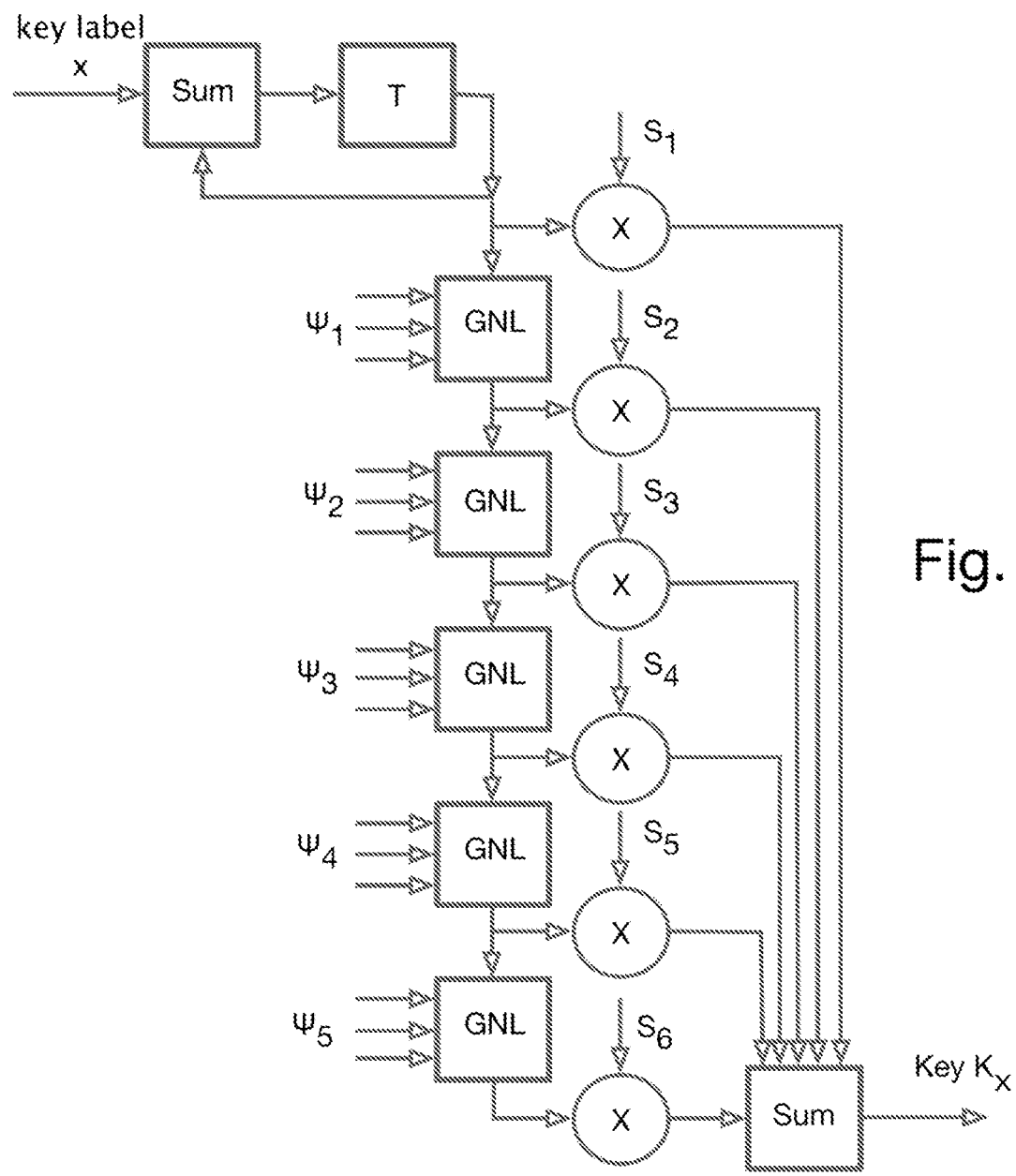
FIG. 14 is a block diagram of a circuit consisting of a nested arrangement of GNL devices, each having three additional inputs, operating on an input key label with outputs being multiplied by different values before being summed to form a key according to a sixth embodiment of the invention.

As before, the properties of Lagrange polynomial interpolation ensure that the same key is produced regardless of which particular combination of three players form the quorum.
The same key is also produced by the sixth embodiment which features a quorum of a single player. The circuit that is used is shown in FIG. 14 which produces the output $$x \cdot S_1+GNL_{\psi 1}(x) \cdot S_2+GNL_{\psi 2}(GNL_{\psi 1}(x)) \cdot S_3+GNL_{\psi 3} \\ (GNL_{\psi 2}(GNL_{\psi 1}(x))) \cdot S_4+GNL_{\psi 4}(GNL_{\psi 3}(GNL_{\psi 2} \\ (GNL_{\psi 1}(x)))) \cdot S_5+GNL_{\psi 5}(GNL_{\psi 4}(GNL_{\psi 3} \\ (GNL_{\psi 2}(GNL_{\psi 1}(x))))) \cdot S_6=K_x$$

As in the earlier embodiments one or more of the multiple inputs $\psi_1$ to $\psi_5$ to the GNL devices should be changed periodically in case of the worst case situation where an attacker has been able to compromise the previously generated quorum keys plus knowledge of the associated key index values as well as previous GNL multiple input $\psi_1$ to $\psi_5$ values. As with earlier embodiments, even with this knowledge, future quorum keys cannot be predicted by the attacker provided the attacker has not had access to at least m quorum keys prior to the change in one or more of the $\psi_1$ to $\psi_5$ values.

Figure 19:
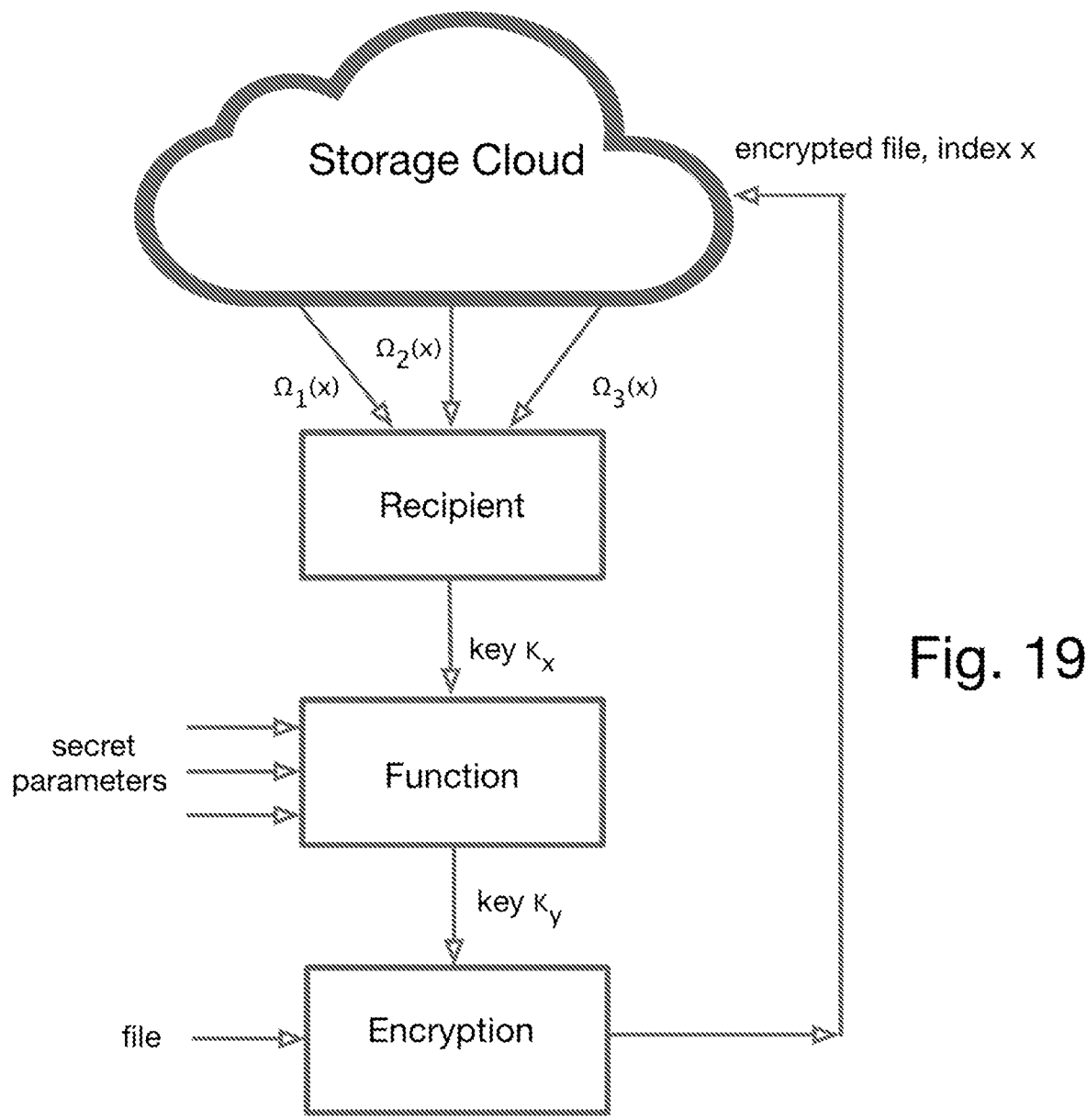
FIG. 19 is a block diagram of a cloud storage system for indexed encrypted files in which the cloud service provider manages the files but has no knowledge of the encryption keys although the cloud service provider is the source of the encryption keys on behalf of one or more clients.

As well as hardware realisations, the various embodiments may be implemented in software running on a computing platform represented schematically in FIG. 19 which may be of a type that is known per se, such as a server, a desktop computer, laptop computer, a tablet computer, a smartphone such as an iOS™, Blackberry™ or Android™ based smartphone, a 'feature' phone, a personal digital assistant (PDA), or any processor-powered device with suitable input and display means. Network/Internet communications may comprise a terrestrial cellular network such as a 2G, 3G or 4G network, a private or public wireless network such as a WiFi™-based network and/or a mobile satellite network or a wired/fibre communications system. Embodiments of the present invention may be implemented as programmable code for execution by such computer systems. It is well known how to produce software that simulates the actions of circuits such as feedback and feedforward shift registers, encryption devices, hash function devices and general non-linear devices. After reading this description, it will become apparent to a person skilled in the art how to implement the invention using computer systems and/or computer architectures.

Alternative embodiments may be implemented as control logic in hardware, firmware, or software or any combination thereof.

Considerations of the Number or Symbol Base

As previously mentioned the values processed in the various embodiments may be numbers or symbols which may from any pre-selected number base such as a Galois field based on a prime or prime power or based on rational numbers including integers. Alternatively, values may be integers reduced modulo q where q is any fixed integer or may be just integers with no modulo operation. In the latter case there is a potential problem in that the inverse of a particular value may not exist because of the choice of number base. The problem arises in the calculation of the Lagrange coefficients. For a general quorum of k players from n players, the Lagrange coefficient for a player with player index $x_1$ is $$\lambda_{x1} = \frac{\prod_{i=2}^{n}(-x_i)}{\prod_{i=2}^{n}(x_1 - x_i)}$$

If a factor in the denominator does not have an inverse then $\lambda_{x1}$ cannot be evaluated. The solution is to set the quorum key not to $K_x$ but to $(n-1)! K_x$. The player with index $x_1$ now computes terms similar to $$\Omega_1 = \frac{\prod_{i=2}^{n}(-x_i)(i-1)}{\prod_{i=2}^{n}(x_1 - x_i)} f_1(x_1) + \dots$$

Similar expressions are obtained for the other player outputs. The numerator now always contains the same factors as the denominator and no inverses are required.

Application Examples

Quorum Document Encryption System

Figure 15:
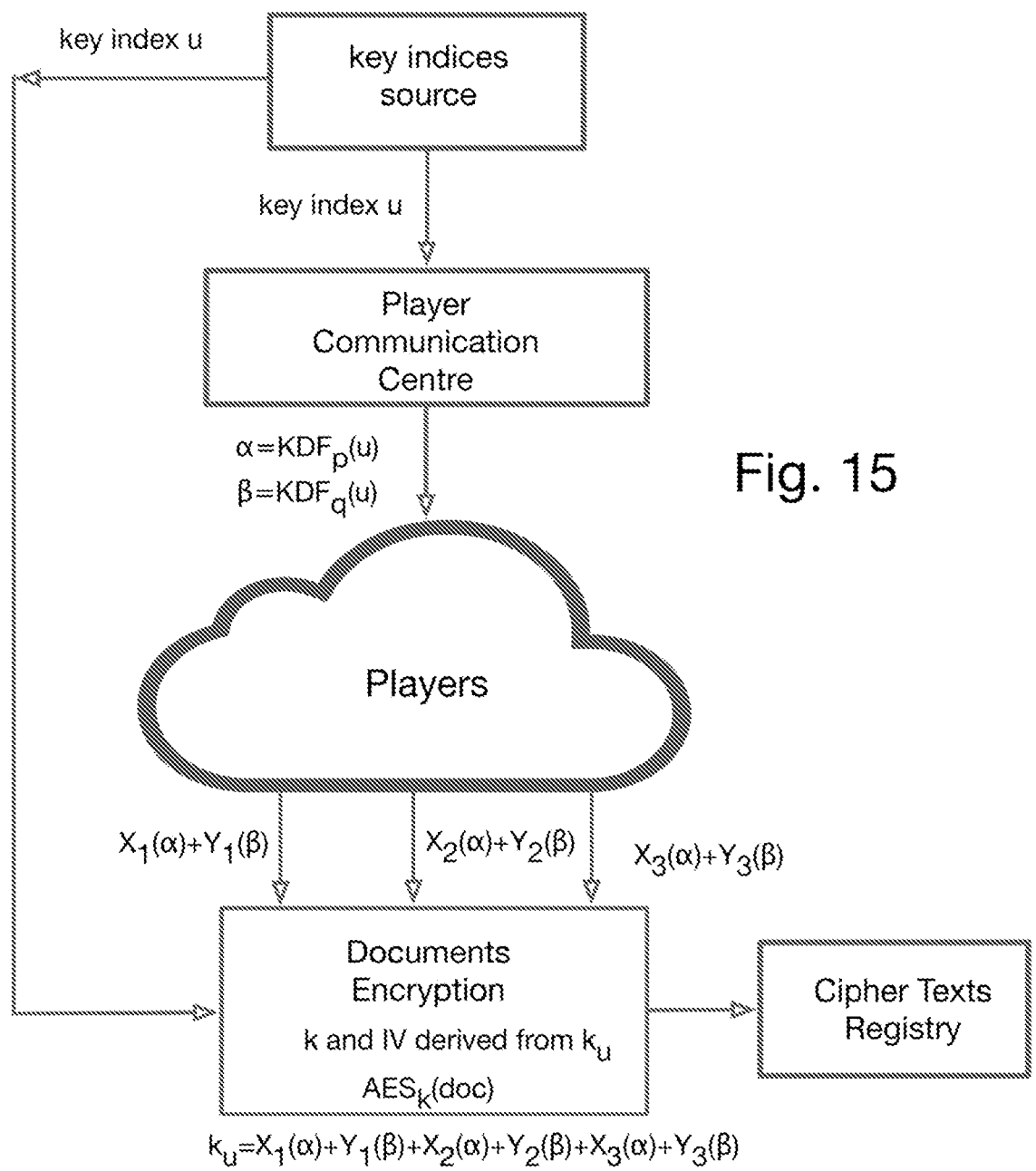
FIG. 15 is a block diagram of a encryption system in which the players produce encryption key components which are combined to form an encryption key used to encrypt a document which is input to a cipher text registry.

An example of a quorum documents encryption system is shown in FIG. 15 and features quorum key construction where three active players out of n players act independently. In this example there are two sets of m polynomials and each player possesses 2m secret values corresponding to polynomial evaluations for their player index. None of the players can determine the encryption key that they construct. All k active players would need to collude together to determine any encryption keys.

Quorum construction of a key starts with the key indices source originating a key index for the key, u. This index is sent to the player communication centre which uses two key derivation functions (KDF) with respective keys p and q to produce $\alpha$ and $\beta$ which are sent to the players. The key derivation functions are there to ensure that it is impossible for an attacker, knowing u and gaining access to some secret keys, to obtain any information about the two sets of original multiple secrets.

A choice is made of one of the embodiments from embodiments one, three or five. From the key index u the final generated secret key is $K_u = K_\alpha + K_\beta$ by implementing two instances of the embodiment. The key $K_u$ is constructed from the players' outputs. Each of the k active quorum players uses their 2m shares to calculate respectively a combined value $Z_i(u) = X_i(u) + Y_i(u)$ which they output as shown in FIG. 15. Note that each player only outputs the single value $Z_i(u)$. Each of the two components of $Z_i(u)$ are there to blind each other in the event that an attacker gains access to $Z_i(u)$. Knowledge of $Z_i(u)$ provides no information about $X_i(u)$ or $Y_i(u)$ individually.

Document encryption is carried out using AES-GCM, the AES variant that is AES with Galois Counter Mode which is a combined encryption and authentication method. As well as the encryption key K, AES-GCM requires a distinct initialisation vector, IV of 96 bits. A HMAC key derivation function is used to expand $K_u$ into the key K and the IV. The HMAC function used to generate the IV includes as input the document to be encrypted concatenated with a timestamp. This is to ensure that each generated IV is distinct, necessary for AES-GCM.

With K and IV calculated the document is encrypted into the ciphertext $C_u$ which is stored in the cipher texts registry as shown in FIG. 15. The key material $K_u$, K and IV is then permanently deleted. The maximum plaintext document length is limited to 64 GB as the GCM 32 bit counter will overflow and repeat with longer documents compromising the stream cipher. One advantage of AES-GCM is that no padding is required, as with all stream ciphers.

Figure 16:
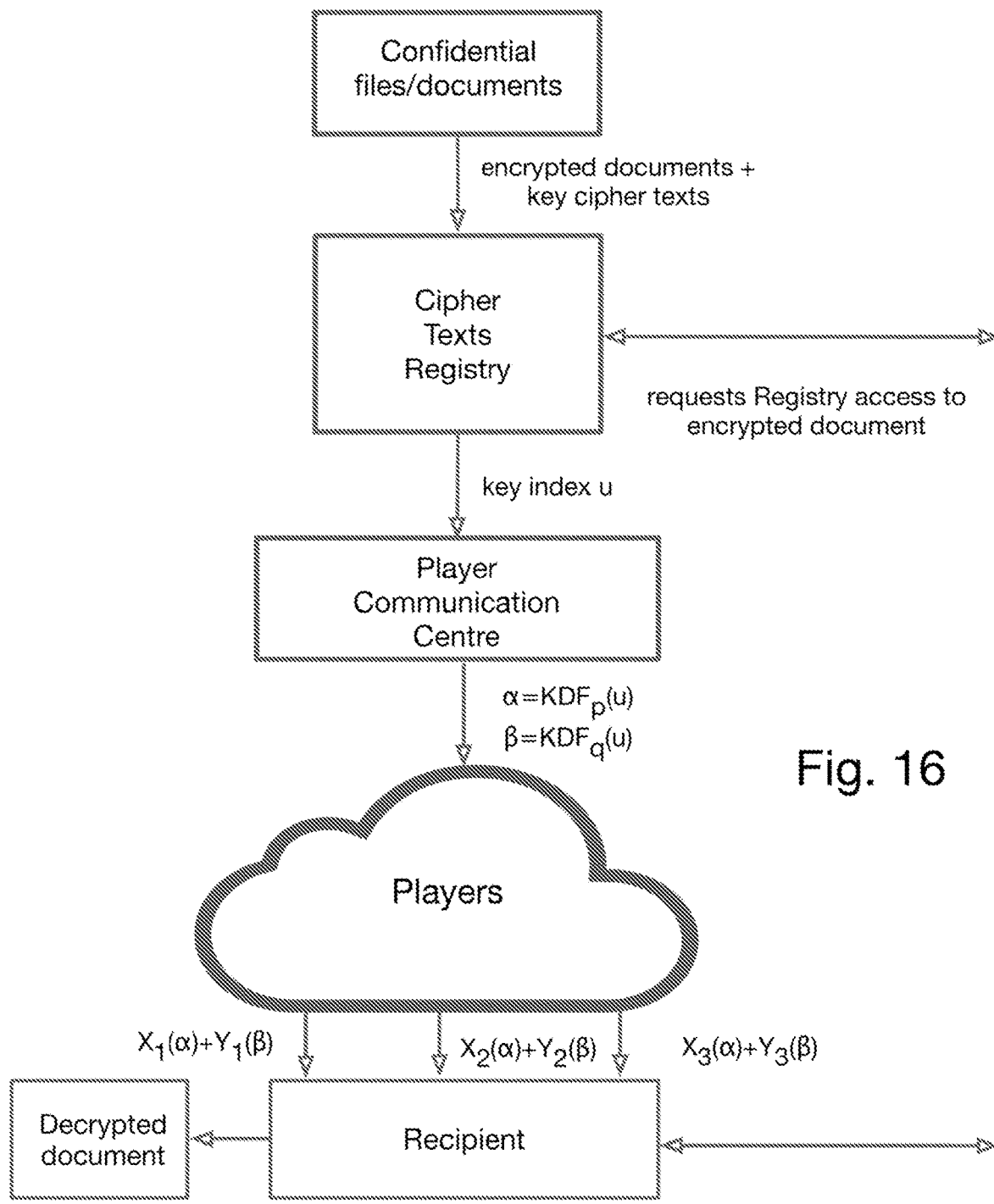
FIG. 16 is a block diagram of a decryption system in which the players produce decryption key components which are combined by the recipient to form the decryption key which is used to decrypt a document received as a cipher text from the cipher text registry.

The document decryption system is shown in FIG. 16 and is similar to the encryption system. As the document encryption uses the symmetric key system, AES, for each encrypted document, the decryption key K is the same as the encryption key K. As before to derive K, the key $K_u$ is constructed by summing the outputs from each of the k active quorum players. The decryption players may be the same set of players as the encryption players or may be a different set of players with different shares as described for the embodiments above.

As shown in FIG. 16 the recipient requests access to an encrypted document and communicates a request for access to the cipher texts registry. The registry responds by selecting a set of active decryption players and sends the cipher text index u to the Player Communication Centre which in turn uses the two key derivation functions with respective keys p and q to produce α and β. These are sent securely to the active decryption players.

Each of the k active players uses their 2m shares to calculate their respective $Z_i(u)=X_i(u)+Y_i(u)$ which they output as shown in FIG. 16. The recipient sums the k values $Z_i(u)$ to produce $K_u$.

From $K_u$ the recipient derives the AES-GCM decryption key K and IV. The recipient is then able to decrypt the document cipher text retrieved from the cipher texts registry to produce the required document.

Quorum Digital Signature for Cryptocurrency Block Chain

Figure 17:
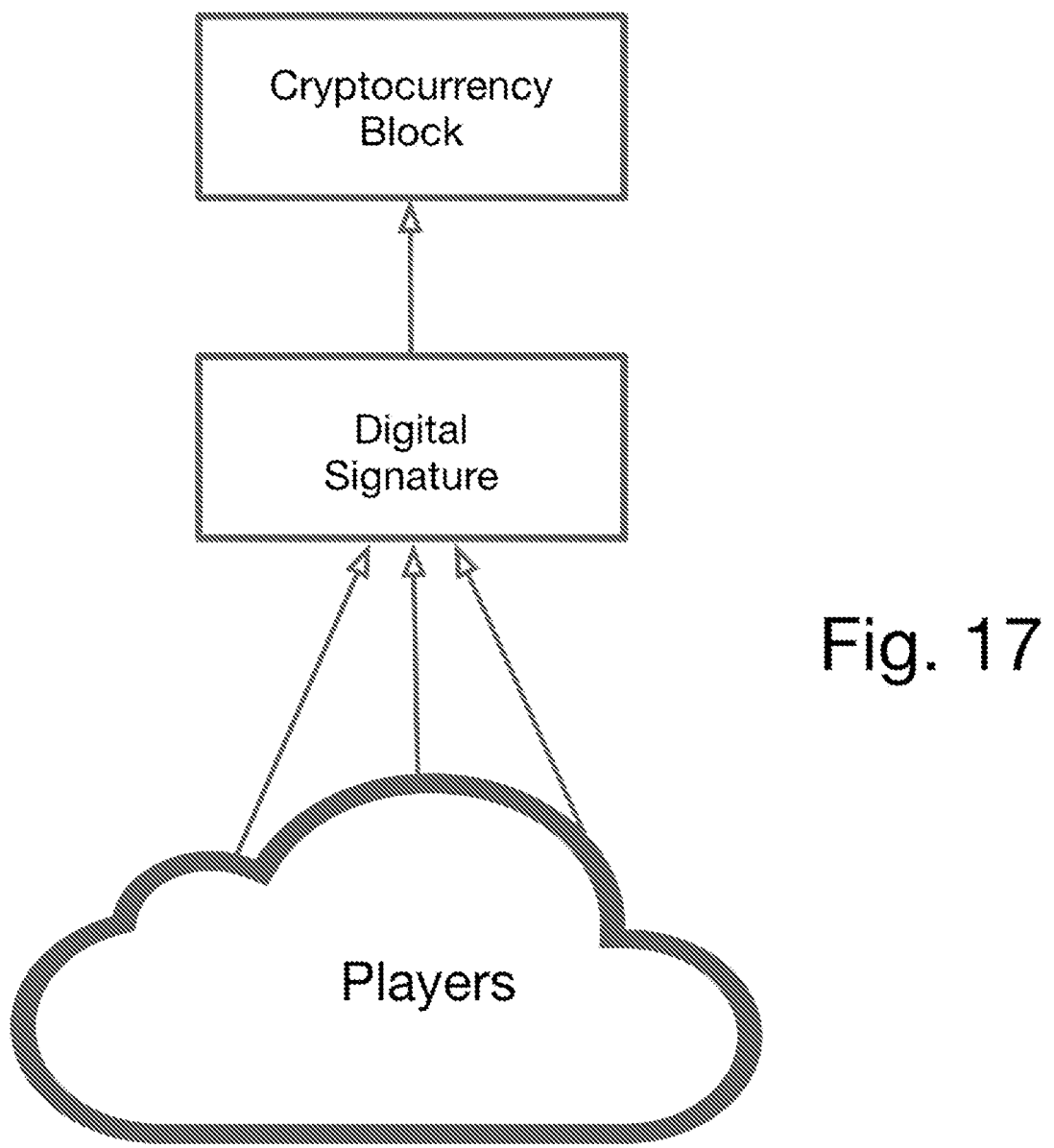
FIG. 17 is a block diagram of the invention being used in a crypto currency application where players produce key components which are combined to form a key used to generate a digital signature in order to authenticate a crypto currency block of recorded transactions.

The system in outline is shown in FIG. 17. Cryptocurrency transactions require periodic signing off in the current block of transactions which include hash binding with previously signed blocks in order to produce the block chain. It is highly desirable that the digital signatures be quorum based.

In this example it is assumed that a hash based digital signature system is to be used since this is future proof from quantum computer attack unlike conventional digital methods such as RSA and Digital Signature Algorithm. Hash based digital signature systems are authenticated by using disclosed tree values to calculate the tree root and comparing this value with the public record.

In a Merkel hash tree there are $2^\lambda$ private keys $X_i$ and $2^\lambda$ public keys $Y_i$ where commonly $Y_i=hash(X_i)$. The hash function is typically a cryptographic hash function such as SHA-256 having the property that it is highly first and second preimage resistant. Knowing $Y_i$ it is virtually impossible to determine $X_i$ except by brute force search. Secondly knowing $X_i$ and $Y_i$ it is virtually impossible to determine a different value of X that hashes to $Y_i$.

Hash based signature systems are one time use signature systems such that each different signature requires and uses one of the private keys. Signature index i uses private key $X_i$ with the $X_i$ usually chosen randomly and the corresponding $Y_i$ calculated along with evaluation of the Merkel tree in a set up phase.

The invention may be used, for example the second embodiment, to generate the private keys by using as input the signature index i for the key index generating $K_i$ as the output, then setting $X_i$ equal to $K_i$ running the index i from 1 through to $2^\lambda$. With the $2^\lambda$ $X_i$ values produced the corresponding $2^\lambda$ $Y_i$ hashes are calculated and the Merkel tree evaluated with publication of the tree root value. The $X_i$ private keys are then permanently deleted.

When signing block i the first embodiment is used with i as key index input to generate, using a quorum of players, the private key $X_i$. With $X_i$ quorum generated the one time use digital signature is then able to be constructed along with the hash based verifications which form part of the digital signature in keeping with current practice.

Independent Key Authority Applications

In several applications there is a need for a trusted authority to be able to generate keys without ever knowing the keys they generate. Similarly sometimes it is required that users are never able to generate keys themselves. In this way the number of keys is strictly controlled. Furthermore the trusted authority which generates the keys cannot, by definition, access any of the users' encrypted secrets. This can be useful in a commercial environment where one company, a security company manage generation and distribution of keys and a client company uses the keys. An example is a secure cloud enterprise provider and an independent client company that uses the cloud to store their corporate information. Encrypted files may be managed by both companies since they both know the encryption key indices which are common. In the case of the cloud provider, storage of duplicated encrypted files can be avoided, significantly reducing storage costs.

Figure 18:
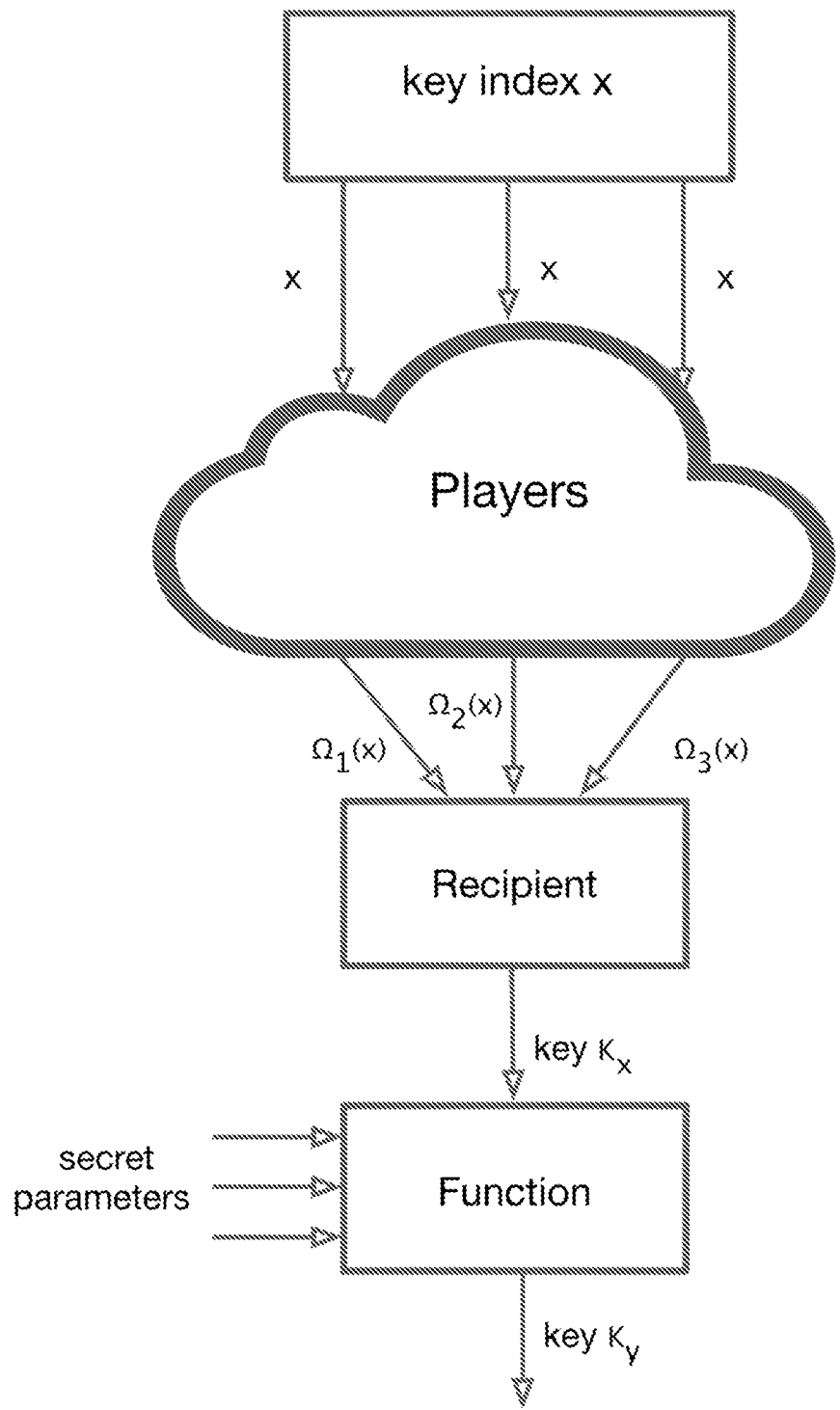
FIG. 18 is a block diagram showing a key derivation function with additional secret inputs being used to prevent the players from learning the final produced key, even if the players all collude together.

The system is shown in FIG. 18. The generation of keys is quorum based using a quorum of players so that trust is distributed. FIG. 18 shows a quorum size of three, but any quorum size is possible. The players may consist of a number of independent servers operating at different locations so that individual employees have limited access to the whole system. Three servers implementing embodiments 1 or 3 or 5 each receive a key index x and send $\Omega_1(x)$, $\Omega_2(x)$ and $\Omega_3(x)$ respectively to a recipient who combines these to produce the key $K_x$. The recipient will be typically an employee in the client user company. The recipient does not use $K_x$ to encrypt any of their corporate information but instead uses a key generation function operating on $K_x$ to produce the key $K_y$. which is used to encrypt the corporate information. As well as the main input $K_x$ the key generating function has secret inputs as shown in FIG. 18. These inputs are private keys generated by the client user company and kept secret, known only by employees of the client user company. A simple example of such a key generating function is $K_y=(K_x+S)^d$ modulo p where S, d and p are secret parameters generated and retained by the client user company.

An example of a cloud based storage system based on this aspect is shown in FIG. 19. The recipient is an employee of a client company that uses the cloud for storage of encrypted files that need to be kept confidential for their business activities. Only employees of the client company know the encryption keys so only they can encrypt files for storage in the cloud or decrypt encrypted files stored in the cloud.

The cloud based storage system is provided by a cloud storage company that accommodates storage of encrypted files for client companies. The cloud storage company holds no encryption keys and cannot open any of the stored encrypted files but does manage the files. In particular it does not want to waste storage space by storing any duplicates of encrypted files uploaded by employees of their client companies. This is achieved by associating each encrypted file with an encryption key index which the cloud storage company knows.

The recipient first generates a key index which is sent to the cloud service which uses its quorum servers to generate key components $\Omega_1(x)$, $\Omega_2(x)$ and $\Omega_3(x)$ respectively and these are sent to the recipient as shown in FIG. 19. In this example the quorum size is three. The recipient combines the key components to form $K_x$ and determines the encryption key $K_y$ by using the key derivation function providing the secret inputs.

The recipient encrypts a file using the key $K_y$ and uploads the encrypted file along with the key index to the cloud as shown in FIG. 19. At this point the key $K_y$ would usually be deleted. If the recipient wishes to share the file with a colleague he or she sends the key index to the colleague.

Provided the colleague has the necessary credentials and knowledge of the secret inputs for the key derivation function, they send the key index to the cloud service, receives key components, forms $K_x$ and determines the decryption key $K_y$, downloads the encrypted file and decrypts it accessing the file.

Quorum McEliece Public Key Cryptosystem

There is a public key system known as the McEliece system which was invented by the distinguished mathematician Robert McEliece and published in 1978, "A Public-Key Cryptosystem based on Algebraic Coding Theory", DSN Progress Report 42-44. The method depends upon the difficulty of correcting unknown random errors contained in a redundant cipher text. The redundancy is based upon parity bits generated from an unknown Goppa error correcting code by using the public key. The private key contains information about the particular Goppa code used and enables the random errors contained in the cipher text to be removed. The McEliece public key cryptosystem is one of the few public key cryptosystems that is immune from attack by a quantum computer unlike systems such as RSA and Elgamal. There have been a number of improvements and variations published such as U.S. Pat. Nos. 5,054,066, 8,958,553 and GB1501874.0.

The invention provides a means to realise a quorum based McEliece system. As an example, User A wants to send to User B an encrypted confidential file using the McEliece system but User A does not want User B to be able to access the confidential file without implicit permission from a quorum of senior officials within their organisation. The encryption stage is shown in FIG. 19. User A encrypts the confidential file using the public key of User B to produce a cipher text. User A randomly generates a key index u and input parameters $\psi_1$ to $\psi_m$ and sends these to an HSM which implements the sixth embodiment featuring the GNL devices, The HSM has been pre-loaded with the m randomly generated, secret values modulo a prime p. The prime p is sufficiently large that the number of bits needed to represent it exceeds the cipher text length in bits.

The HSM securely sends to User A the key $K_u$. User A adds the key $K_u$ to the cipher text, modulo p to form a blinded cipher text and sends the blinded cipher text to User B. User A encrypts the key index u and input parameters $\psi_1$ to $\psi_m$ using User B's McEliece public key and sends the resulting cipher text to User B.

Figure 20:
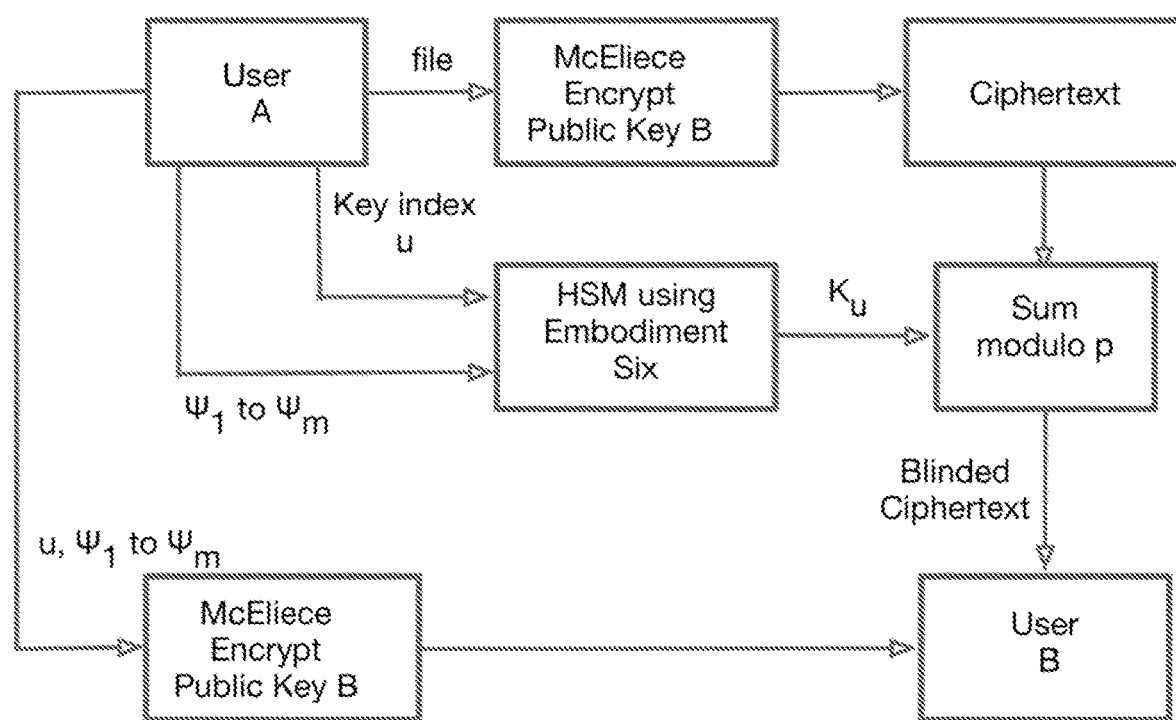
FIG. 20 is a block diagram of a McEliece public key encryption system featuring a cipher text being blinded by a key generated using one of the embodiments.
Figure 21:
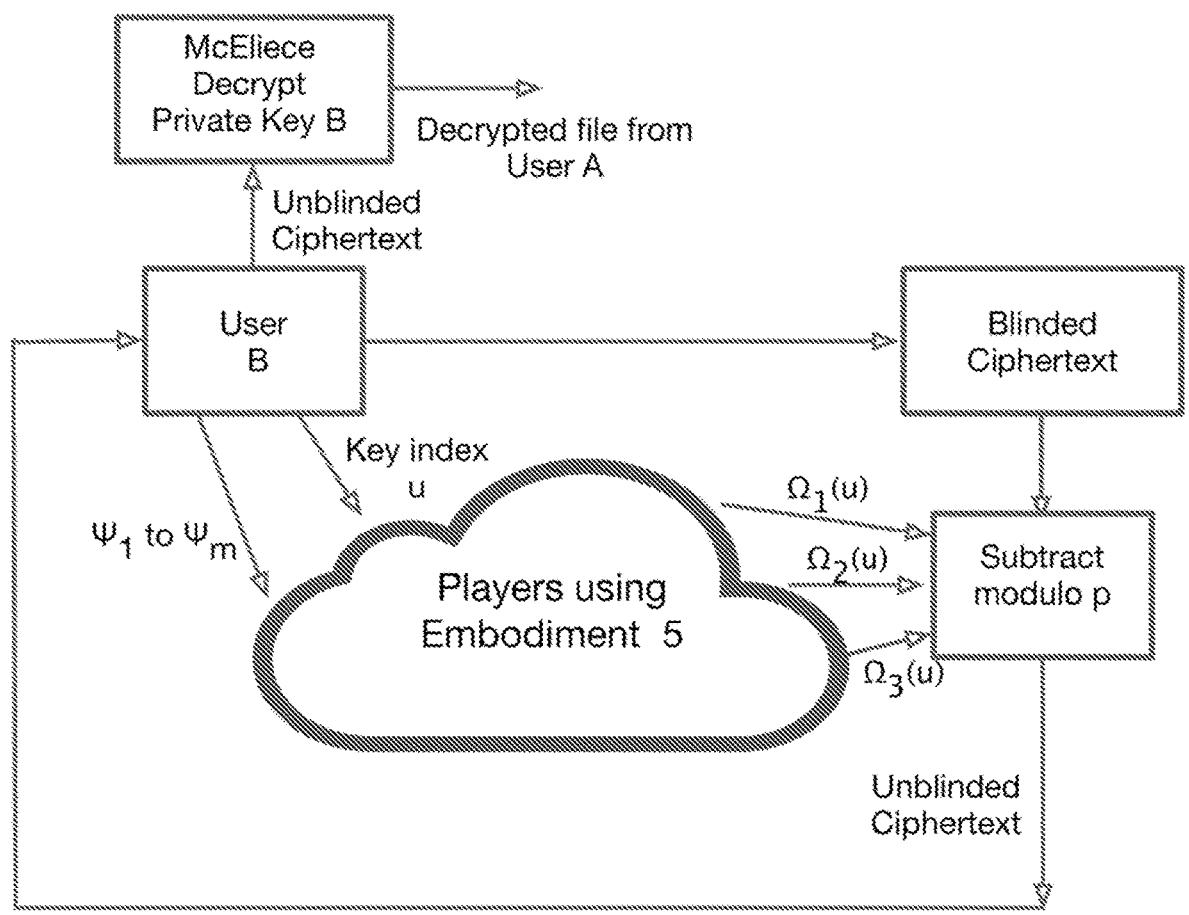
FIG. 21 is a block diagram of a McEliece public key decryption system featuring a user receiving a blinded cipher text in which a quorum of players using one of the embodiments provide a key which is used to unblind the cipher text allowing decryption by the user.
Figure 22:
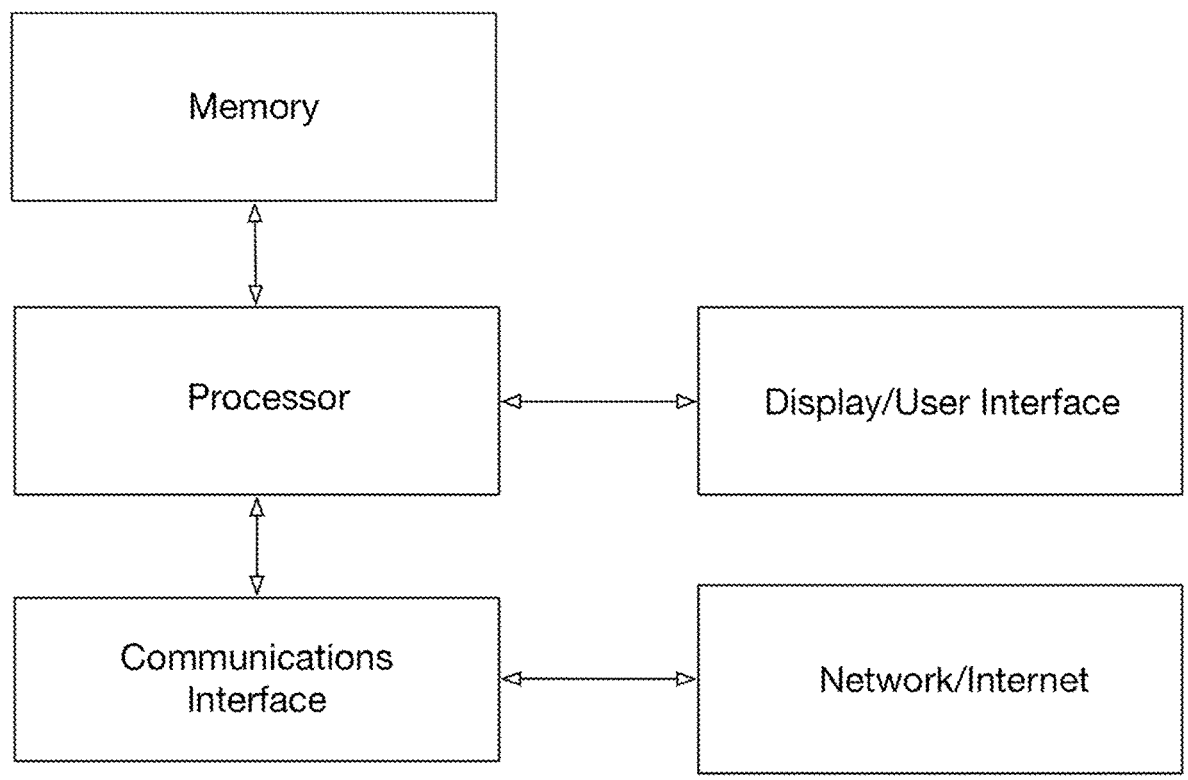
FIG. 22 is a block diagram of an example of a computer system on which one or more of the functions of the embodiments may be implemented.

User B uses his or her private key to decrypt the key index u and input parameters $\psi_1$ to $\psi_m$ and sends these parameters to a quorum of k players as shown in FIG. 20. User B requests permission from the players to access the blinded cipher text.

During setup, each of the n players have been given, using the prime field p, their respective m realised polynomial values according to the fifth embodiment. The $x^0$ coefficients of the m polynomials having been set to the same secret values as used in the HSM.

With encrypted file access permission granted each of the quorum players sends to User B, as shown in FIG. 20, for a quorum of three, the respective values $\Omega_1$, $\Omega_2$, and $\Omega_3$. User B subtracts each value, modulo p from the blinded cipher text to produce the unblinded cipher text. Finally User B uses his or her private key to decrypt the unblinded cipher text to produce the file originally encrypted by User A.

It should be noted that several variants of this system are possible. For example, instead of using the prime field p for the polynomial evaluation and Lagrange interpolation the Galois field $GF(2^s)$ may be used matching the Galois field used by the McEliece system. This simplifies addition and subtraction as this is now modulo 2, implemented by the exclusive OR function. Other variants include limiting the blinding to a sub-set of the cipher text such as the parity bits portion of the cipher text rather than the complete cipher text.

It will become apparent to a person skilled in the art that this quorum combination is not limited to the McEliece public key cryptosystem but may be applied to any public key or symmetric key encryption system.

Alternatives and Modifications

It will be understood that embodiments of the present invention are described herein by way of example only, and that various changes and modifications may be made without departing from the scope of the invention.

For example, in the embodiments described above, each player device implements a plurality of computational modules (also referred to as circuits or devices), with each module realising a corresponding hash function, an encryption function, or a multiple input/output mapping function. Furthermore, in the embodiments described above, the plurality of computational modules define an ordered series, whereby each module is used once and the output from one module is provided as input to the next module in the series, apart from the final module. As those skilled in the art will appreciate, each player device may be configured to utilise one or more of plurality of computational modules more than once in the defined series. For example, the output from the final module in the defined order may be provided as input back to the first module in the defined order, to implement a recursive ordered series for a predefined number of recursions.

As another alternative, the key indices and input circuit parameters as well as key components can be themselves encrypted, using any suitable encryption system, with a common or distinct key known only to the intended participant, to prevent any third parties learning this information.

For the embodiments that feature inputs to one or more circuits of nested devices, additional elements or values may be provided as inputs, such additional elements or values can represent or be associated with further information for verifying or authenticating a particular individual or entity, and may be received or retrieved from various data sources. For example, the additional elements or values may be current Global Positioning System (GPS) coordinates of a user's computing device, automatically determined and retrieved from a GPS module of the device. Inputs needed to reconstruct the original key may be data associated with the player's current physical location, as described by GPS coordinates retrieved from the associated computing device (or from a connected GPS module). The quorum participants have to be at, or within, a predefined geographical location, or at the same location as the other participants, in order for the original data to be reconstructed. Additionally or further alternatively, the additional values may be time or date stamps so that quorum participants have to input their data at predefined times or dates in order for the original data to be reconstructed. Additionally or further alternatively, the additional values may be identification data associated with the computing device, such as a mobile phone number, identification number, network address, serial number, etc. The reconstruction process would therefore include automatic retrieval of the identification data from the computing device as additional inputs to produce the reconstructed key, where reconstruction of the original key is only possible if the quorum portions are received from an authorised device. In this way, a further level of identity verification and authentication is thereby integrated into the quorum-based data process of the present embodiment.

In the embodiments described above, the quorum key or code portions are transmitted to and stored by computing devices of respective authorised users of the system. As those skilled in the art will appreciate, as an alternative, the quorum key or code portions may instead be provided in the form of an authentication token. For example, the quorum key or code portions may be encoded and stored in a magnetic strip of a physical card, or may be encoded as a bar- or QR-code that is printed on a physical or displayed on a virtual card, or may be encoded and stored in a RFID tag. As another example, the quorum key or code portions may be stored in a hardware dongle with a wireless data communication interface for communicating the quorum data to the quorum system via a corresponding communication interface. As yet another example, the quorum system may be configured with an interface for receiving user input of the respective quorum key or code portions, and to output the reconstructed data temporarily on a display, or to communicate the reconstructed data to a further data processing device for example to complete decryption of data using the reconstructed secret key, or to a device controlling access to a secured asset, such as an electronic lock that is unlocked in response to receiving the correct reconstructed passcode. In such an example, the quorum system may be incorporated as a processing module or element of the further data processing device or access controlling device. Additionally, the quorum key or code portions may be electronically communicated to the respective authorised users, for example by email or text message.

As another alternative, rather than sub-dividing the quorum data amongst authorised players as described in the embodiments above, the simulated circuits and quorum vectors may be distributed amongst a plurality of computing device(s), authentication token(s) and/or security dongle(s) associated with one particular user, for improved multi-factor authentication based on quorum portions received from the predefined minimum number of user authentication devices.

Yet further alternative embodiments may be envisaged, which nevertheless fall within the scope of the following claims.

The invention claimed is:

1. A computing device associated with a respective user of available participants that are authorized to participate as quorum members for quorum-based data recovery in a secured computing environment, the computing device comprising:
a computer-readable memory storing a plurality of instructions;
one or more processors coupled to the computer readable memory, the one or more processors configured to execute the instructions to provide a quorum key component, by:
receiving a set of m data values each computed by applying a unique index value x, assigned to the computing device, to each one of m polynomials $f_m(x)$ of degree k−1 for deriving secret keys for a quorum of k out of n computing devices, wherein each of m received secret data values is multiplied by a value calculated based upon the unique index values assigned to the k computing devices forming the quorum;
receiving an index value of the quorum-based key that is to be reconstructed from k quorum key components;
generating, using a series of m computation modules of the computing device, a value of the quorum key component, each computation module configured to perform a corresponding cryptographic operation on an input value, wherein:
the first computation module receives the index value of the quorum-based key as input, and each following computation module in the series receives the output of the preceding computation module as input; and
the value of the quorum key component is calculated based upon the combination of the outputs of the series of computation modules, each computation module output being multiplied by a corresponding one of the m received secret data values before being combined to produce said quorum key component;
transmitting the quorum key component to a key reconstructor for reconstruction of the quorum-based cryptography key; and
securing access to an asset by a plurality of authorized participants using the quorum-based cryptography key when a minimum number of quorum key components are received from a corresponding quorum of the authorized participants and used to reconstruct the quorum-based cryptography key.

2. The computing device of claim 1, wherein access to an asset secured by a plurality of authorized participants using the quorum-based cryptography key is only possible when a minimum number of quorum key components are received from a corresponding quorum of the authorized participants and used to reconstruct the quorum-based cryptography key.

3. The computing device of claim 1, wherein the quorum-based cryptography key is a functional cryptographic key for encrypting or decrypting data within the secured computing environment after being reconstructed from the quorum of k quorum key components.

4. A method of generating a quorum key component, wherein a quorum-based cryptography key is reconstructable from any k out of n quorum key components, the method comprising:
receiving, by a computing device associated with a respective user of available participants that are authorized to participate as quorum members for quorum-based data recovery in a secured computing environment:
a set of m secret data values, each computed by applying a unique index value x, assigned to the computing device, to each one of m polynomials $f_m(x)$ of degree k−1 for deriving secret keys for a quorum of k out of n computing devices, wherein each of m received secret data values is multiplied by a value calculated based upon the unique index values assigned to the k computing devices forming the quorum, and
an index value of the quorum-based key that is to be reconstructed from k quorum key components; and
generating, using a series of m computation modules of the computing device, a value of the quorum key component, each computation module configured to perform a corresponding cryptographic operation on an input value, wherein:
the first computation module receives the index value of the quorum-based key as input, and each following computation module in the series receives the output of the preceding computation module as input; and the value of the quorum key component is calculated based upon the combination of the outputs of the series of computation modules, each computation module output being multiplied by a corresponding one of the m received secret data values before being combined to produce said quorum key component, transmitting the quorum key component to a key reconstructor for reconstruction of the quorum-based cryptography key; and securing access to an asset by a plurality of authorized participants using the quorum-based cryptography key when a minimum number of quorum key components are received from a corresponding quorum of the authorized participants and used to reconstruct the quorum-based cryptography key.

5. A method according to claim 4, further comprising:
receiving at least a predetermined minimum number k of said generated quorum key components; and
determining a reconstructed cryptography key from the sum of the k received quorum key components.

6. A method according to claim 1, wherein at least one of the devices implements a hash function.

7. A method according to claim 1, wherein at least one of the devices implements an encryption function with a predefined encryption key.

8. A method according to claim 1, wherein at least one of the devices implements a general multiple input/output mapping function specific to the computing device.

9. A method according to claim 1, wherein a document or confidential file is encrypted into a cipher text according to the key index and in which a recipient uses said key index to gain access to the encryption key to decrypt said cipher text.

10. A method according to claim 1, wherein a private key is generated for use in a digital signature method and in which said private key is reconstructed based on quorum key components received from a quorum of participants or entities to generate a multiple party digital signature.

11. A method according to claim 1, wherein each block of transactions in a cryptocurrency system is digitally signed by the reconstructed quorum-based key.

12. A method according to claim 1, wherein an encryption system is used to produce a cipher text to which is added the reconstructed key to produce a corrupted cipher text which is sent to a recipient along with quorum input parameter values and in which said recipient uses said quorum input parameter values to produce said reconstructed data which is subtracted from said corrupted cipher prior to decryption of said cipher text by the recipient.

13. A method according to claim 12, wherein the encryption system is based on the McEliece public key cryptosystem.

14. A method according to claim 1, wherein the reconstructed key is a private key that is generated by one or more entities for use by a third party, and wherein said third party subjects said private key to a key derivation function to produce a second private key that is known only by said third party.

15. A method according to claim 14, wherein a cloud storage system or data storage facility manages an encrypted file by means of an encryption key index on behalf of clients who alone know the reconstructed encryption key.

16. A method according to claim 4, wherein each one of n computing devices transmits a respective quorum key component to the key reconstructor for reconstruction of the quorum-based cryptography key.

17. A method according to claim 4, wherein the same set of m polynomials is used to compute m secret data values by each of said n computing devices.

18. A method according to claim 4, wherein each one of said m secret data values is further multiplied by a value calculated based upon the unique index values assigned to the k computing devices forming the quorum.

19. A method according to claim 4, wherein identical m original data values are used with the same set of m polynomials so that an identical reconstructed key is determined from at least a minimum number of received quorum key components.

20. A method according to claim 19, wherein each polynomial $f_j(x)$ comprises at least one coefficient value selected from a corresponding set of m original data values.

21. A method according to claim 20, wherein the remaining coefficient values of said polynomial are randomly chosen.

22. A method according to claim 19, wherein:
the $x^0$ coefficient value of each polynomial is selected from the corresponding set of m original data values; and
the multiplier value is a Lagrange coefficient $\lambda_x$, computed based on:

$$\lambda_x = \frac{\prod_{i=2}^{k}(-x_i)}{\prod_{i=2}^{k}(x-x_i)}$$

where $x_i$ is the unique index value of a respective computing device i.

23. A method according to claim 4, wherein at least one of the computation modules implements an encryption function with a predefined encryption key.

24. A method according to claim 4, wherein at least one of the computation modules implements a general multiple input/output mapping function specific to the computing device.

25. A method according to claim 4, further comprising delaying inputs to the computation devices so that the computed outputs are output at the same time.

26. A method according to claim 1, further comprising generating the set of m secret data values received by the computing device by evaluating the polynomial for the unique index value x assigned to the computing device for each of m polynomials $f_m(x)$ of degree k−1 for deriving m secret data values for each one of n computing devices, each polynomial having at least one coefficient value selected from a corresponding set of m original data values.

27. A non-transitory computer-readable medium storing a plurality of computer-executable instructions, that when executed perform a method of generating a quorum key component, wherein a quorum-based cryptography key is reconstructable from any k out of n quorum key components, the method comprising:
receiving, by a computing device associated with a respective user of available participants that are authorized to participate as quorum members for quorum-based data recovery in a secured computing environment:
a set of m secret data values, each computed by applying a unique index value x, assigned to the computing device, to each one of m polynomials $f_m(x)$ of degree k−1 for deriving secret keys for a quorum of k out of n computing devices, wherein each of m received secret data values is multiplied by a value calculated based upon the unique index values assigned to the k computing devices forming the quorum, and an index value of the quorum-based key that is to be reconstructed from k quorum key components; and generating, using a series of m computation modules of the computing device, a value of the quorum key component, each computation module configured to perform a corresponding cryptographic operation on an input value, wherein:

the first computation module receives the index value of the quorum-based key as input, and each following computation module in the series receives the output of the preceding computation module as input; and the value of the quorum key component is calculated based upon the combination of the outputs of the series of computation modules, each computation module output being multiplied by a corresponding one of the m received secret data values before being combined to produce said quorum key component, transmitting the quorum key component to a key reconstructor for reconstruction of the quorum-based cryptography key; and securing access to an asset by a plurality of authorized participants using the quorum-based cryptography key when a minimum number of quorum key components are received from a corresponding quorum of the authorized participants and used to reconstruct the quorum-based cryptography key.

* * * * *